United States Patent
Kim et al.

(10) Patent No.: US 11,144,156 B2
(45) Date of Patent: Oct. 12, 2021

(54) ELECTRONIC DEVICE INCLUDING DISPLAY AND SENSOR

(71) Applicant: Samsung Electronics Co., Ltd., Suwon-si (KR)

(72) Inventors: Yongwoon Kim, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/933,227

(22) Filed: Jul. 20, 2020

(65) Prior Publication Data
US 2021/0041978 A1 Feb. 11, 2021

(30) Foreign Application Priority Data

Aug. 7, 2019 (KR) .................. 10-2019-0096075

(51) Int. Cl.
- *G06F 3/0354* (2013.01)
- *G06F 3/041* (2006.01)
- *G06F 3/046* (2006.01)
- *G06K 9/00* (2006.01)

(52) U.S. Cl.
CPC ........ *G06F 3/0416* (2013.01); *G06F 3/03545* (2013.01); *G06F 3/046* (2013.01); *G06K 9/00013* (2013.01); *G06K 9/00912* (2013.01); *G06F 2203/04114* (2019.05)

(58) Field of Classification Search
CPC ............... G09G 3/3677; G09G 3/3266; G09G 2310/0286; G09G 3/20; G09G 3/3674; G11C 19/28
See application file for complete search history.

(56) References Cited

U.S. PATENT DOCUMENTS

| 8,723,842 | B2 | 5/2014 | Kaneda et al. |
| 9,621,219 | B1 | 4/2017 | Richmond et al. |
| 10,509,492 | B2* | 12/2019 | Zhang .................. G06F 3/017 |
| 2002/0103616 | A1* | 8/2002 | Park ................ H04W 52/0267 |
| | | | 702/150 |

(Continued)

FOREIGN PATENT DOCUMENTS

KR 10-2016-0047385 A 5/2016

OTHER PUBLICATIONS

International Search Report dated Nov. 25, 2020, issued in International Application No. PCT/KR2020/009505.

*Primary Examiner* — Jonathan A Boyd
(74) *Attorney, Agent, or Firm* — Jefferson IP Law, LLP

(57) ABSTRACT

An electronic device is provided. The electronic device includes a display, a input detection panel to detect an input of a digital pen, a sensor disposed to overlap the display and the input detection panel, when the display is viewed from a top, and at least one processor operatively connected with the display, the input detection panel, and the sensor. The at least one processor is to detect an attempt of activation of the sensor, activate the sensor and control at least a portion of a charging operation through the input detection panel, when the digital pen is positioned at a charging position, identify whether the input of the digital pen is detected, when the digital pen is not positioned at the charging position, deactivate the sensor, when the input of the digital pen is detected, or activate the sensor, when the input of the digital pen is not detected.

20 Claims, 21 Drawing Sheets

(56) References Cited

U.S. PATENT DOCUMENTS

| | | | |
|---|---|---|---|
| 2012/0032909 A1* | 2/2012 | Wang | G06F 3/0416 |
| | | | 345/174 |
| 2012/0043142 A1 | 2/2012 | Grivna | |
| 2012/0071149 A1 | 3/2012 | Bandyopadhyay et al. | |
| 2013/0016064 A1* | 1/2013 | Lee | G06F 3/0416 |
| | | | 345/174 |
| 2016/0352383 A1 | 12/2016 | Richmond et al. | |
| 2020/0064933 A1 | 2/2020 | Zhang et al. | |

* cited by examiner

ELECTRONIC DEVICE INCLUDING DISPLAY AND SENSOR

CROSS-REFERENCE TO RELATED APPLICATION(S)

This application is based on and claims priority under 35 U.S.C. § 119(a) of a Korean patent application number 10-2019-0096075, filed on Aug. 7, 2019, in the Korean Intellectual Property Office, the disclosure of which is incorporated by reference herein in its entirety.

BACKGROUND

1. Field

The disclosure relates to a technology of an electronic device including a display and a sensor.

2. Description of Related Art

Recently, as the size of a display occupied in an electronic device increases, an in-display sensor, in which a sensor is included inside the display, has been considered. For example, the electronic device may include a fingerprint sensor to recognize a fingerprint of a display user. For another example, the electronic device may include at least one of a proximity light sensor, or an image sensor provided in the display.

The electronic device may provide an environment of inputting handwriting on a display by allowing a user to use a digital pen (or a stylus pen). The electronic device may include a input detection panel (e.g., a digitizer or a touch-screen panel) provided at a position close to the display or inside the display. The electronic device may not only detect the input of the digital pen, but also charge a battery of the digital pen through the input detection panel.

The above information is presented as background information only to assist with an understanding of the disclosure. No determination has been made, and no assertion is made, as to whether any of the above might be applicable as prior art with regard to the disclosure.

SUMMARY

When the sensor is activated while the electronic device is charging the digital pen, the recognition rate of the sensor may be deteriorated due to noise caused by a charging signal induced through the input detection panel. In addition, when the sensor is activated, the electronic device may fail to normally detect the input of the digital pen due to the interference between a signal generated from the sensor and a signal generated from the input detection panel.

Aspects of the disclosure are to address at least the above-mentioned problems and/or disadvantages and to provide at least the advantages described below. Accordingly, an aspect of the disclosure is to provide a method of an electronic device embedding a sensor inside a display and using the sensor.

Additional aspects will be set forth in part in the description which follows and, in part, will be apparent from the description, or may be learned by practice of the presented embodiments.

In accordance with an aspect of the disclosure, an electronic device is provided. The electronic device includes a display, an input detection panel to detect an input of a digital pen, a sensor disposed to be overlapped with the display and the input detection panel, when the display is viewed from a top, and at least one processor operatively connected with the display, the input detection panel, and the sensor. The at least one processor is configured to detect an attempt of activation of the sensor, activate the sensor and control at least a portion of a charging operation through the input detection panel, when the digital pen is positioned at a charging position, identify whether the input of the digital pen is detected, when the digital pen is not positioned at the charging position, deactivate the sensor, when the input of the digital pen is detected, or activate the sensor, when the input of the digital pen is not detected.

In accordance with another aspect of the disclosure, a method of an electronic device is provided. The method includes detecting an attempt of activation of a sensor, activating the sensor and controlling at least a portion of a charging operation, when a digital pen is positioned at a charging position, identifying whether an input of the digital pen is detected, when the digital pen is not positioned at the charging position, deactivating the sensor, when the input of the digital pen is detected, and activating the sensor, when the input of the digital pen is not detected.

In accordance with another aspect of the disclosure, an electronic device is provided. The electronic device includes a display, an input detection panel to detect an input of a digital pen, a fingerprint sensor disposed to be overlapped with the display and the input detection panel, when the display is viewed from a top, and at least one processor operatively connected with the display, the input detection panel, and the fingerprint sensor. The at least one processor is configured to detect an attempt of activation of the fingerprint sensor, output, to the display, a first graphical user interface (GUI) to guide an fingerprint input of a user, in response to detecting that the fingerprint sensor is activated, and detect the input of the digital pen on the display, and output, to the display, a second GUI indicating that the fingerprint sensor is deactivated, in response to that the input of the digital pen is detected.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following descriptions with reference to the accompanying drawings is provided to assist in a comprehensive understanding of the various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
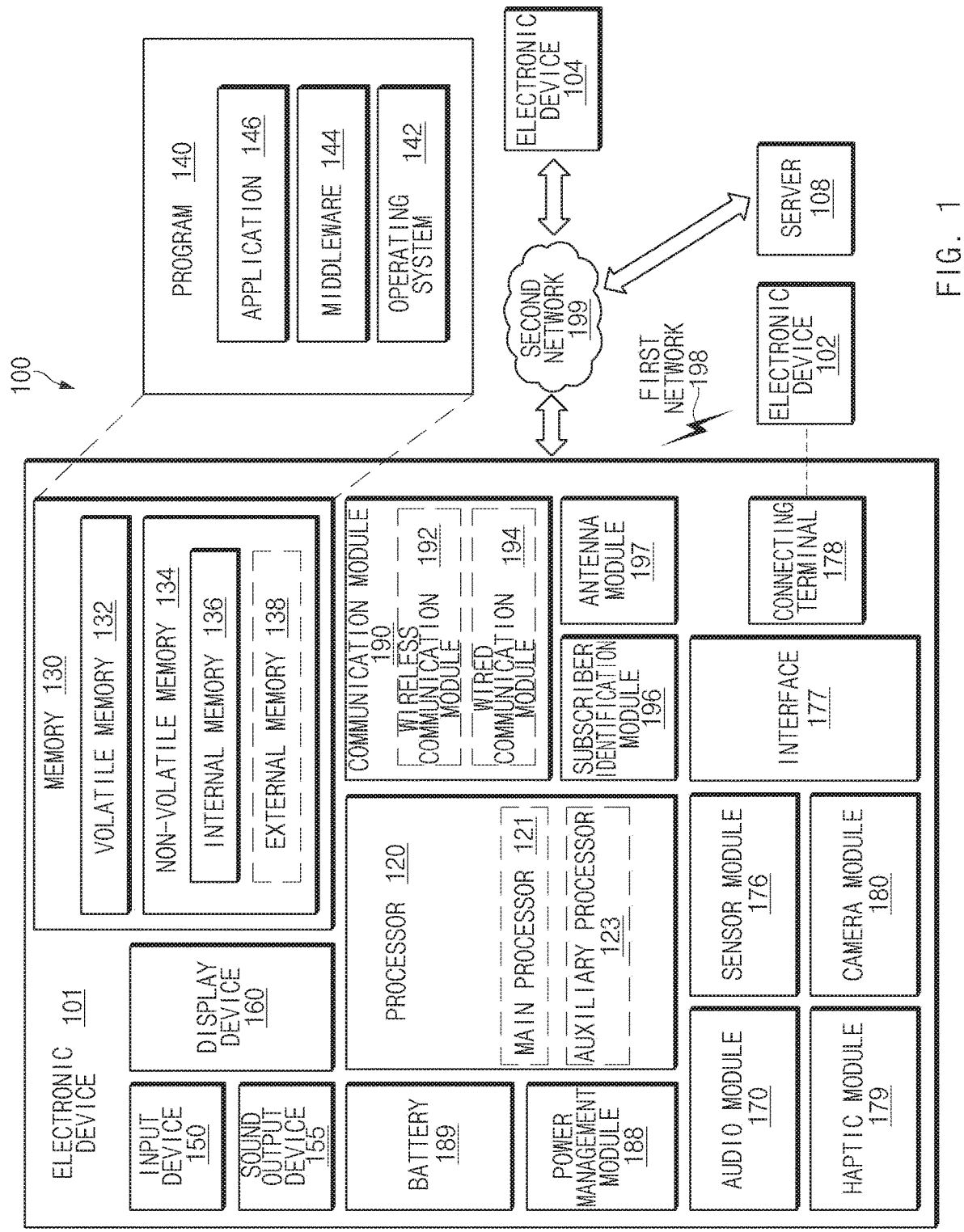
FIG. 1 is a block diagram of an electronic device under a network environment according to an embodiment of the disclosure.

FIG. 1 is a block diagram illustrating an electronic device in a network environment 100 according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
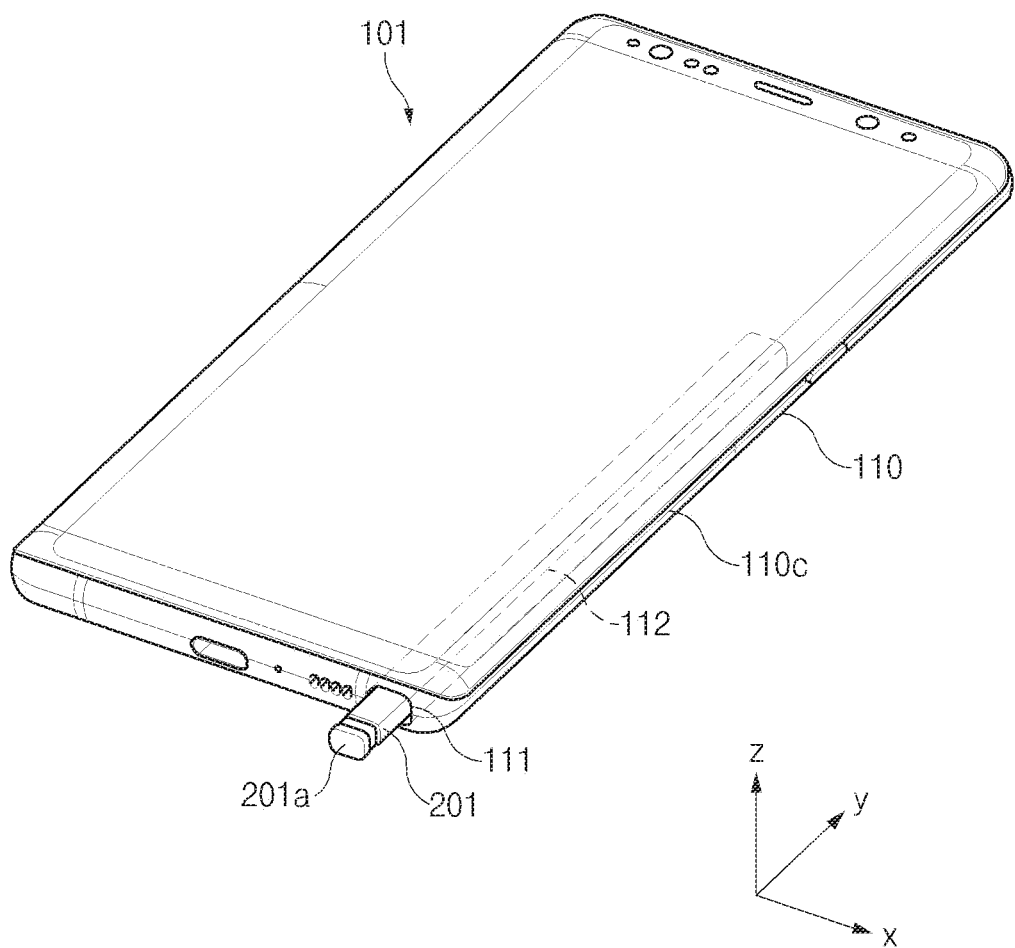
FIG. 2A is a perspective view of an electronic device into which a digital pen is inserted according to an embodiment of the disclosure.
Figure 2B:
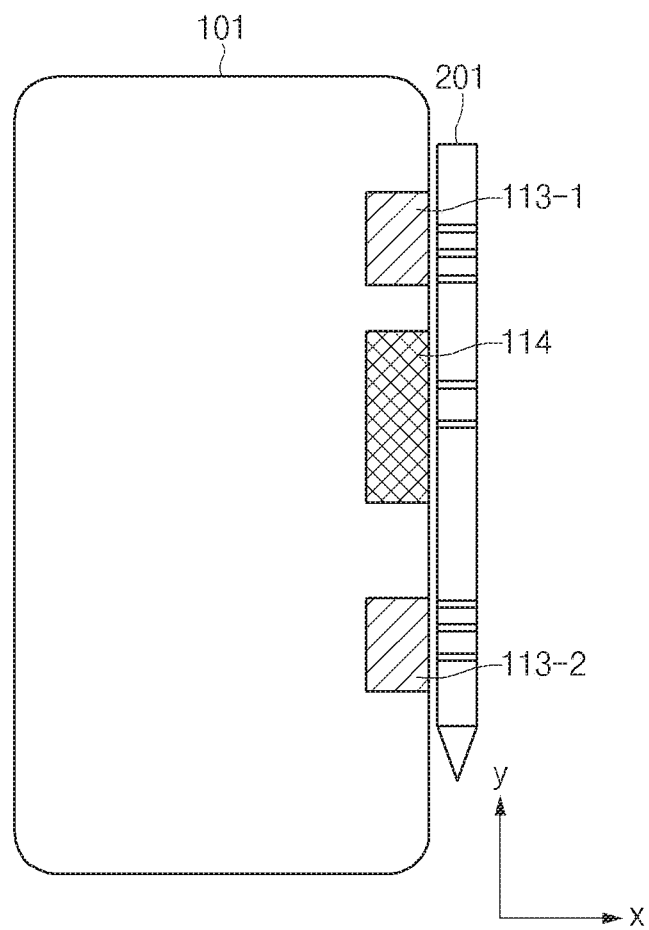
FIG. 2B is a plan view of an electronic device to attach a digital pen to an outer portion of the electronic device according to an embodiment of the disclosure.

FIGS. 2A to 2B illustrate a structure of an electronic device to charge a digital pen according to various embodiments of the disclosure.

FIG. 2A is a perspective view of an electronic device to insert a digital pen into an electronic device according to an embodiment of the disclosure, and FIG. 2B is a plan view of an electronic device to attach a digital pen to an outer portion of an electronic device according to an embodiment of the disclosure.

Referring to FIG. 2A, the electronic device 101 may include a structure to insert the digital pen 201 (e.g., a stylus pen). The electronic device 101 may include a housing 110 and include a hole 111 formed in a portion of the housing 110, for example, a portion of a side surface 110C of the housing 110. According to one embodiment of the disclosure, the electronic device 101 may include a receiving space 112 communicating with the hole 111, and the digital pen 201 may be inserted into the receiving space 112. According to embodiments that are illustrated, the digital pen 201 may include a button 201*a*, which is able to be pressed, at one end portion thereof such that the digital pen 201 is easily ejected from the receiving space 112 of the electronic device 101. When the button 201*a* is pressed, repulsion mechanisms (e.g., at least one spring) configured in association with the button 201*a* are activated, such that the digital pen 201 may be ejected from the receiving space 112.

Referring to FIG. 2B, the electronic device 101 may include a structure to attach the digital pen 201 to an outer portion of the electronic device 101. For example, the electronic device 101 may include at least one magnetic substance 113-1 or 113-2 which is provided at a position adjacent to a side surface (e.g., the side surface 110*c* of FIG. 2A). The digital pen 201 may be attached to an outer portion of the housing 110 of the electronic device 101 through the at least one magnetic substance 113-1 or 113-2. Although FIG. 2B illustrates two magnetic substances 113-1 and 113-2, the number of magnetic substances are not limited thereto.

When the digital pen 201 is received in the receiving space 112 or attached to the side surface of the electronic device 101, the electronic device 101 may charge the battery of the digital pen 201 by transmitting a charging signal through a conductive coil included in the electronic device 101. The conductive coil may be disposed, for example, at a position adjacent to the receiving space 112 or at a partial area (e.g., 114) of the side surface of the electronic device 101. For another example, the conductive coil may be disposed at a position which is at least partially overlapped with a display (e.g., the display device 160 of FIG. 1) when viewed from the top of the electronic device 101.

Figure 3:
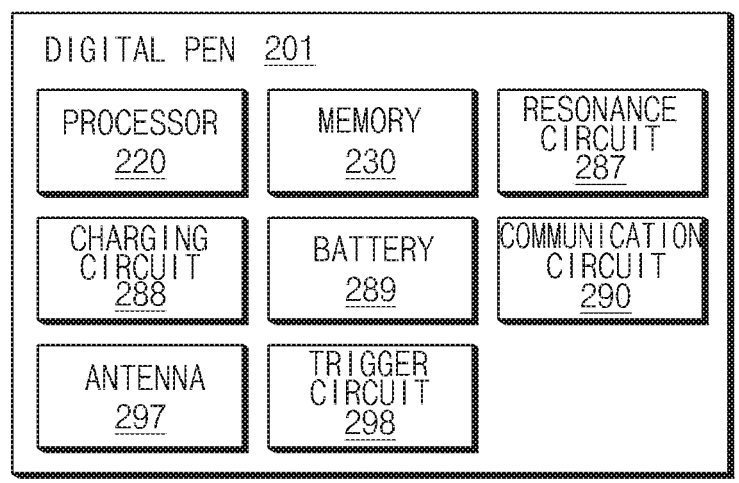
FIG. 3 is a block diagram of a digital pen according to an embodiment of the disclosure.

FIG. 3 is a block diagram of a digital pen according to an embodiment of the disclosure.

Referring to FIG. 3, according to an embodiment of the disclosure, the digital pen 201 may include a processor 220, a memory 230, a resonance circuit 287, a charging circuit 288, a battery 289, a communication circuit 290, an antenna 297, and/or a trigger circuit 298. In an embodiment of the disclosure, the processor 220 of the digital pen 201, at least a portion of the resonance circuit 287, and/or at least a portion of the communication circuit 290 may be configured on a printed circuit board (PCB) or in the form of a chip. The processor 220, the resonance circuit 287 and/or the communication circuit 290 may be electrically connected with the memory 230, the charging circuit 288, the battery 289, the antenna 297 or the trigger circuit 298. In an embodiment of the disclosure, the digital pen 201 may include only both of the resonance circuit and the button.

According to an embodiment of the disclosure, the processor 220 may include a generic processor configured to execute a customized hardware module or software (e.g., an application program). The processor 220 includes a hardware component (function) or software component (program) including at least one of various sensors, a data measurement module, an input/output interface, a module to manage the state or environment of the digital pen 201, or a communication module, which is provided in the digital pen 201. The processor 220 may include, for example, one of hardware, software, or firmware or the combination of at least two of hardware, software, or firmware. According to one embodiment of the disclosure, the processor 220 may receive a proximity signal corresponding to an electromagnetic field signal generated from a input detection panel (e.g., 470 of FIG. 4) of the electronic device 101 through the resonance circuit 287. Once the proximity signal is identified, the processor 220 may control the resonance circuit 287 to transmit an electro-magnetic resonance (EMR) input signal to the electronic device 101

According to one embodiment of the disclosure, the memory 230 may store information on the operation of the digital pen 201. For example, the information may include information for the communication with the electronic device 101 and frequency information associated with the input operation of the digital pen 201.

According to one embodiment of the disclosure, the resonance circuit 287 may include at least one of a coil, an inductor, or a capacitor. The resonance circuit 287 may be used for the digital pen 201 to generate a signal including the resonance frequency. For example, to generate a signal, the digital pen 201 may use at least one of an electro-magnetic resonance (EMR) scheme, an active electrostatic (AES) scheme, or an electrically coupled resonance (ECR) scheme. When the digital pen 201 transmits a signal through the EMR scheme, the digital pen 201 may generate a signal including a resonance frequency based on an electromagnetic field generated from an inductive panel of the electronic device 101. When the digital pen 201 transmits a signal through the AES scheme, the digital pen 201 may generate a signal using capacity coupling with the electronic device 101. When the digital pen 201 transmits a signal through the ECR scheme, the digital pen 201 may generate a signal including a resonance frequency, based on an electric field generated from a capacitive device of the electronic device 101. According to one embodiment of the disclosure, the resonance circuit 287 may be used to change the intensity or frequency of the electromagnetic field depending on the operation state of the user. For example, the resonance circuit 287 may provide a frequency for recognizing a hovering input, a drawing input, a button input, or an erasing input.

According to an embodiment of the disclosure, when the charging circuit 288 is connected with the resonance circuit 287 based on a switching circuit, the resonant signal generated from the resonance circuit 287 may be rectified to a DC signal to be applied to the battery 289. According to an embodiment of the disclosure, the digital pen 201 may identify whether the digital pen 201 is inserted into the electronic device 101, using the voltage level of the DC signal detected by the charging circuit 288.

According to an embodiment of the disclosure, the battery 289 may be configured to store power required for the operation of the digital pen 201. The battery 289 may include, for example, a lithium-ion battery, or a capacitor, and may be rechargeable or interchangeable. According to one embodiment of the disclosure, the battery 289 may be charged with the power supplied from the charging circuit 288 (e.g., a direct current signal (DC power)).

According to one embodiment of the disclosure, the communication circuit 290 may be configured to perform a wireless communication function between the digital pen 201 and a communication module of the electronic device 101. According to one embodiment of the disclosure, the communication circuit 290 may transmit state information and input information of the digital pen 201 to the electronic device 101 through a short-range communication scheme. For example, the communication circuit 290 may transmit direction information (e.g., motion sensor data) of the digital pen 201 obtained through the trigger circuit 298, voice information input through the microphone, or information on a residual amount of the battery 289. For example, the short-range communication scheme may include at least one of Bluetooth, a Bluetooth low energy (BLE), or a wireless LAN.

According to one embodiment of the disclosure, the antenna 297 may be used to transmit or receive a signal or power to or from the outside (e.g., the electronic device 101). According to one embodiment of the disclosure, the digital pen 201 may include a plurality of antennas 297 and may select at least one antenna 297 suitable for the communication scheme thereof. The communication circuit 290 may exchange a signal or power with the external electronic device through the at least one antenna 297 which is selected.

According to an embodiment of the disclosure, the trigger circuit 298 may include at least one button or a sensor circuit. According to an embodiment of the disclosure, the processor 220 may identify an input type (e.g., touching or pressing) or the type (e.g., an EMR button or BLE button) of the button of the digital pen 201. According to an embodiment of the disclosure, the sensor circuit may generate an electrical signal or a data value corresponding to an internal operating state of the digital pen 201 or an external environmental condition of the digital pen 201. For example, the sensor circuit may include at least one of a motion sensor, a remaining battery level detecting sensor, a pressure sensor, an optical sensor, a temperature sensor, a geomagnetic sensor, or a biometric sensor. The motion sensor may include, for example, at least one of an acceleration sensor, a geomagnetic sensor, or a gyro sensor. According to an embodiment of the disclosure, the trigger circuit 298 may transmit a trigger signal to the electronic device 101 using an input signal of a button or a signal through a sensor. According to an embodiment of the disclosure, when the digital pen 201 is inserted into the receiving space 112 or attached to the outer portion of the electronic device 101, the digital pen 201 may turn off the function of the motion sensor.

Although an embodiment in FIG. 3 and embodiments to be described later will be described about the digital pen 201 which is able to be disposed inside or outside the electronic device 101, the same principle may be applied to another external electronic device which may wirelessly interact with the electronic device 101 in addition to the digital pen 201. The another external electronic devices may be, for example, at least one of a portable device (e.g., a smartphone or a tablet), a wearable device (e.g., a smart watch or smart glasses), an earphone, a headset, a camera, or a virtual reality (VR).

Figure 4:
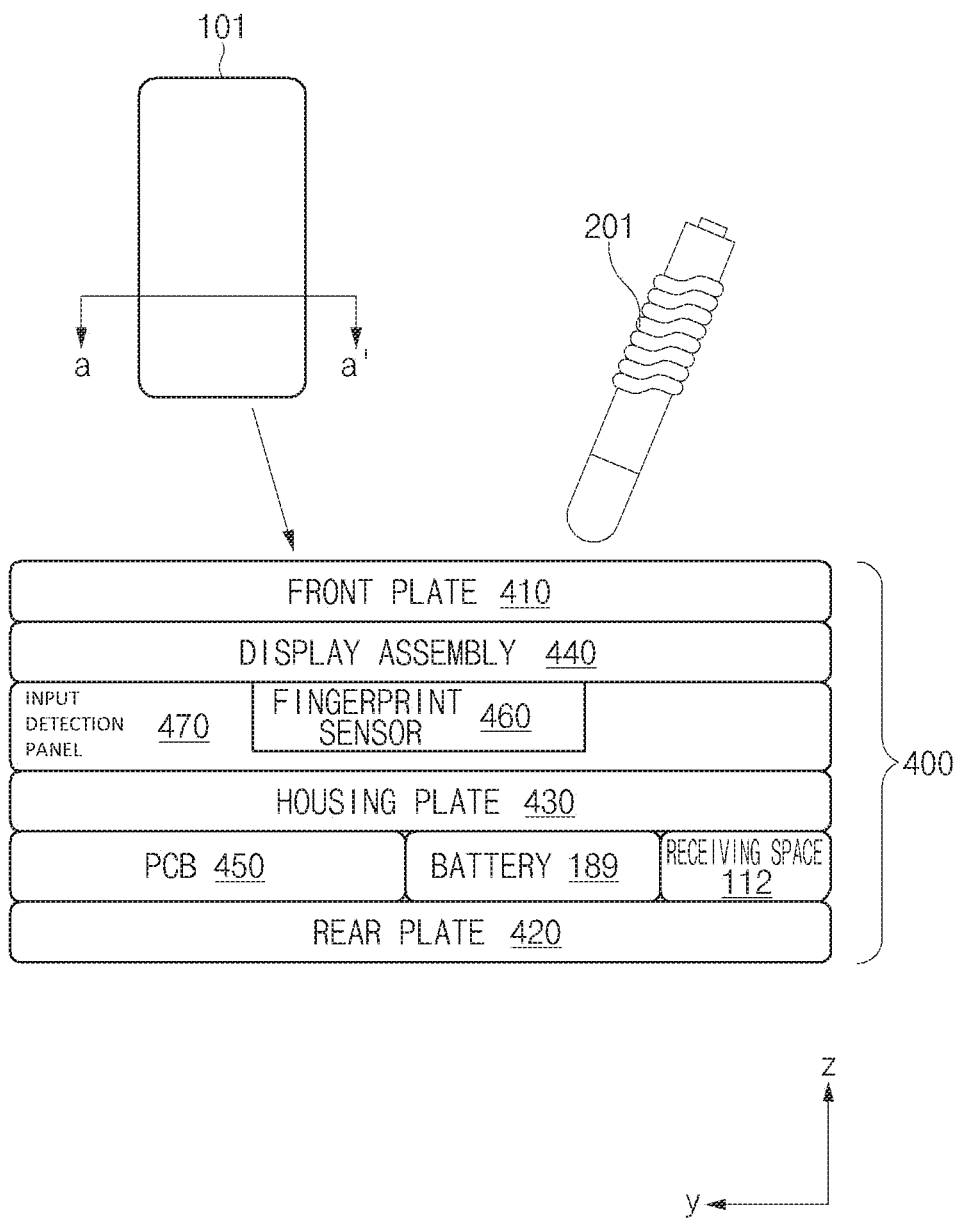
FIG. 4 is a sectional view of an electronic device including a input detection panel and a fingerprint sensor according to embodiment of the disclosure.

FIG. 4 is a sectional view 400 of an electronic device including an input detection panel and a fingerprint sensor according to an embodiment of the disclosure.

For example, the sectional view 400 may illustrate a section taken along line a-a' of the electronic device 101. The following embodiments will be described while focusing on that the electronic device 101 includes the fingerprint sensor 460, and the same principle will be applied to at least one of an image sensor, a proximity light sensor, or a sensor included in the sensor module 176 of FIG. 1.

Referring to FIG. 4, the electronic device 101 may include a front plate 410, a rear plate 420, a housing plate 430, a display assembly 440, a PCB 450, the battery 189, the receiving space 112, the input detection panel 470, and the fingerprint sensor 460. The electronic device 101 may further include at least one of components illustrated in FIG. 1 in addition to components illustrated in FIG. 4. Hereinafter, there will be omitted the duplicated description of a component, which has the same reference numeral, of the components of FIG. 4 which have been described above with reference to the foregoing drawings.

The front plate 410 may be referred to as a window or cover. At least one portion of the front plate 410 may be substantially transparent. For example, the front plate 410 may include at least one of a glass plate or a polymer plate including various coating layers.

The rear plate 420 may be referred to as a cover window or a back cover. The rear plate 420 may include, for example, coated or colored glass, ceramic, polymer, metal (e.g., aluminum, stainless steel, or magnesium), or the combination of at least two of the above materials.

The housing plate 430 may include a side bezel structure or a bracket. The housing plate 430 may be combined with the front plate 410 and the rear plate 420. The housing plate 430 may include metal and/or polymer. According to an embodiment of the disclosure, the display assembly 440 and the input detection panel 470 are coupled on an upper surface (e.g., +z axis) of the housing plate 430, and the PCB 450 may be coupled to a lower surface (e.g., −z axis) of the housing plate 430. According to an embodiment of the disclosure, the rear plate 420 and the housing plate 430 are formed integrally with each other and may include the same material (e.g., a metal material, such as aluminum (Al)).

The display assembly 440 may include at least a portion of the display device 160 (e.g., the display) of FIG. 1. The display assembly 440 may be, for example, visually exposed through at least a portion of the front plate 410. The display assembly 440 may include a touch sensing circuit and/or a pressure sensor to measure the intensity (pressure) of a touch. Although FIG. 4 illustrates that the input detection panel 470 is disposed outside the display assembly 440 according to an embodiment of the disclosure, the display assembly 440 may include the input detection panel 470.

The PCB 450 may include components (e.g., at least one of the processor 120, the memory 130, the camera module 180, the sensor module 176, or the communication module 190) of the electronic device 101 illustrated in FIG. 1.

The input detection panel 470 (e.g., a digitizer or a touch screen panel) may be configured to detect an input of the digital pen 201. For example, the input detection panel 470 may transmit or receive a signal together the digital pen 201 using at least one of the EMR scheme, the AES scheme, or the ECR scheme. The input detection panel 470 may include a PCB (e.g., a flexible printed circuit board (FPCB)) and a shielding sheet. The shielding sheet may prevent the mutual interferences between electromagnetic fields generated from components (e.g., the display assembly 440, the PCB 450, and/or the input detection panel 470) included in the electronic device 101. The shielding sheet shields the electromagnetic fields generated from the components, such that the input from the digital pen 201 is exactly transmitted to the conductive coil (e.g., 510 of FIG. 5) included in the input detection panel 470.

According to various embodiments of the disclosure, the input detection panel 470 may be disposed to be partially overlapped with the fingerprint sensor 460 configured to recognize biometric information (e.g., the fingerprint) of the user, when viewed from the top of the electronic device 101 (e.g., +z axis). In this case, the input detection panel 470 may include an opening, and the fingerprint sensor 460 may be disposed to be overlapped with the opening.

Figure 5:
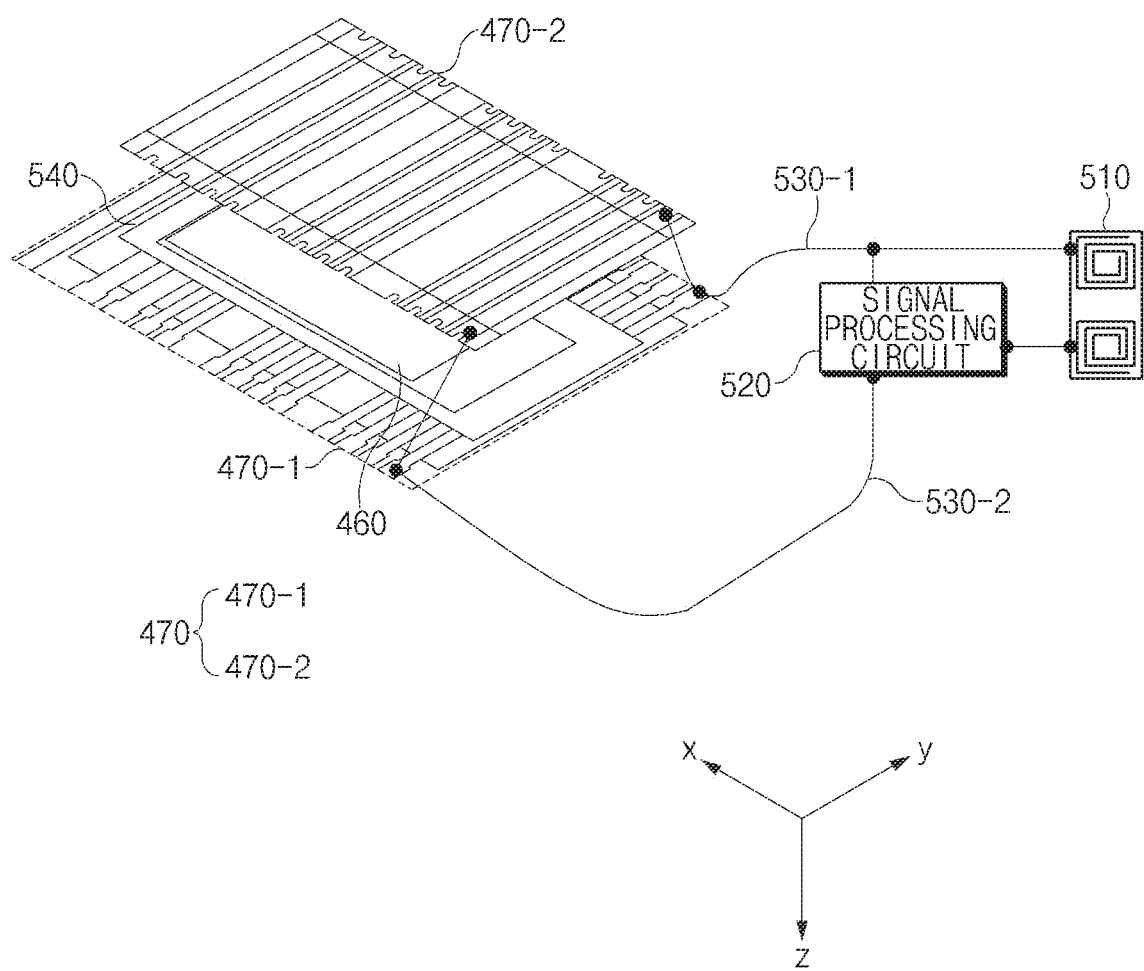
FIG. 5 illustrates a structure of a input detection panel including a fingerprint sensor according to an embodiment of the disclosure.

FIG. 5 illustrates structure of an input detection panel 470 including the fingerprint sensor 460 according to an embodiment of the disclosure.

Referring to FIG. 5, the input detection panel 470 may include a first panel 470-1 and a second panel 470-2. The first panel 470-1 or the second panel 470-2 may be substantially similar to the input detection panel 470 in structure and function. The fingerprint sensor 460 may be inserted into the input detection panel 470 through an opening 540 of the first panel 470-1. As the second panel 470-2 is disposed on the rear surface (e.g., −z axis direction) of the fingerprint sensor 460 and electrically connected with the first panel 470-1, the input detection panel 470 may ensure the linearity when coordinates of the digital pen 201 is input. For another example, although not illustrated in FIG. 5, when another sensor other than the fingerprint sensor 460 is disposed in the input detection panel 470, the second panel 470-2 may be disposed on a front surface (e.g., +z axis direction) of the relevant sensor.

A signal processing circuit 520 may be configured to generate and process a signal having a specified resonance frequency. For example, the signal processing circuit 520 may receive and process a signal corresponding to the input of the digital pen 201 or transmit a charging signal to the digital pen 201, through a conductive coil 510 and the input detection panel 470. For another example, the electronic device 101 may detect the input of the digital pen 201 based on the change in a capacitance (e.g., a self-capacitance or a mutual capacitance) associated with at least one electrode of the input detection panel 470.

According to an embodiment of the disclosure, the first panel 470-1 and the second panel 470-2 may be electrically connected with the signal processing circuit 520 and the conductive coil 510. For example, a first path 530-1 may refer to a transmit path and a second path 530-2 may refer to a receive path. Although FIG. 5 illustrates a single transmit path, the input detection panel 470, the signal processing circuit 520, and the conductive coil 510 may be electrically connected with each other through a plurality of transmit paths so as to enhance the efficiency of charging, according to other embodiments of the disclosure.

The fingerprint sensor 460 is mounted inside the input detection panel 470, so noise of a signal generated from the conductive coil 510 and induced to the input detection panel 470 may cause interference with a signal generated from the fingerprint sensor 460. According to various embodiments of the disclosure, the electronic device 101 may control the activation of the fingerprint sensor 460 or the charging operation, thereby preventing the performance of the fingerprint sensor 460 from being deteriorated due to the interference while performing a function (e.g., drawing or battery charging) associated with the digital pen 201.

For example, when the input of the digital pen 201 is detected even if the electronic device 101 attempts activation of the fingerprint sensor 460, the electronic device 101 may reject the activation of the fingerprint sensor 460 so as to receive the input of the digital pen 201. For another example, when the activation of the fingerprint sensor 460 is attempted while the battery of the digital pen 201 is being charged, the electronic device 101 may activate the fingerprint sensor 460 and deactivate the charging operation, or may control at least a portion of the transmit path electrically connected with the input detection panel 470.

Figure 6:
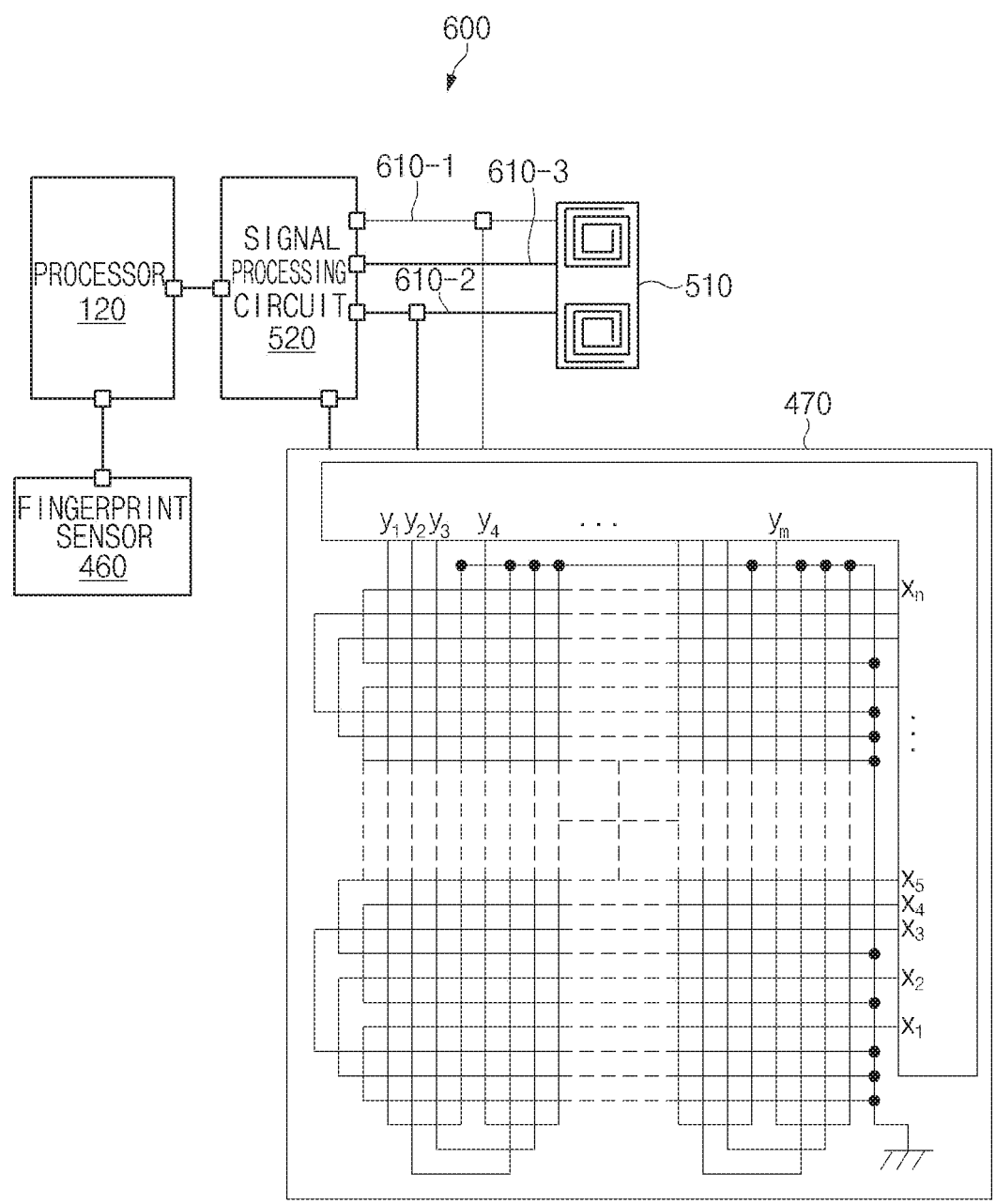
FIG. 6 is a block diagram of an electronic device including a input detection panel and a fingerprint sensor according to an embodiment of the disclosure.

FIG. 6 is a block diagram 600 of an electronic device including an input detection panel and a fingerprint sensor according to an embodiment of the disclosure.

Referring to FIG. 6, the signal processing circuit 520, the conductive coil 510, and the input detection panel 470 may be electrically connected with each other. A first transmit path 610-1 and a second transmit path 610-2 are included in the first path 530-1 of FIG. 5, and a receive path 610-3 is included in the second path 530-2 of FIG. 5. According to an embodiment of the disclosure, the first transmit path 610-1 and the second transmit path 610-2 may be connected with mutually different areas of the input detection panel 470. For example, the first transmit path 610-1 may be connected with first conductive patterns (e.g., $x_1, x_2, x_3, x_4, \ldots,$ and $x_n$. n is a natural number) to detect x axis coordinates, and the second transmit path 610-2 may be connected with second conductive patterns (e.g., $y_1, y_2, y_3, y_4, \ldots,$ and $y_m$. m is a natural number) to detect y axis coordinates. For another example, the first transmit path 610-1 may be connected with an area of the input detection panel 470, which is adjacent to an area of fingerprint sensor 460, and the second transmit path 610-2 may be connected with an area of the input detection panel 470, which is not adjacent to the area of the fingerprint sensor 460.

According to an embodiment of the disclosure, the signal processing circuit 520 may be electrically connected with the processor 120. The processor 120 may, for example, include an application processor (AP). The signal processing circuit 520 and the processor 120 may be configured in separate chips, or may be configured in one chip or module.

According to an embodiment of the disclosure, the processor 120 may detect the attempt of the activation of the fingerprint sensor 460. For example, when a user input for an area, in which the fingerprint sensor 460 is included, is received, a user input for requesting the activation of the fingerprint sensor 460 for user authentication is received, or an application request for requesting the activation of the fingerprint sensor 460 is received, the processor 120 may determine the activation of the fingerprint sensor 460 as being attempted.

According to an embodiment of the disclosure, the processor 120 may control the activation of the fingerprint sensor 460. For example, when the input of the digital pen 201 is detected, even if the attempt of the activation of the fingerprint sensor 460 is detected, the processor 120 may deactivate the fingerprint sensor 460. For another example, when the input of the digital pen 201 is not input to the input detection panel 470, the processor 120 may activate the fingerprint sensor 460 in response to detecting the attempt of the activation of the fingerprint sensor 460.

According to an embodiment of the disclosure, the processor 120 may control the activation of the charging operation for the digital pen 201 through the signal processing circuit 520. For example, when the attempt of the activation of the fingerprint sensor 460 is detected while the charging operation for the digital pen 201 is being performed, the processor 120 may deactivate the charging operation for the digital pen 201 through the signal processing circuit 520 to prevent the recognition rate of the fingerprint sensor 460 from being degraded. In this case, the processor 120 may deactivate the transmit path (e.g., the first transmit path 610-1 and the second transmit path 610-2) used for the charging operation, and may activate only the receive path (e.g., the receive path 610-3) for a scanning operation. In the disclosure, the scanning operation may refer to an operation to identify whether the digital pen 201 is positioned at a charging position. For another example, when the transmission of a signal is requested for the scanning operation, the signal processing circuit 520 may deactivate only one of the first transmit path 610-1 or the second transmit path 610-2 for the scanning operation.

Figure 7:
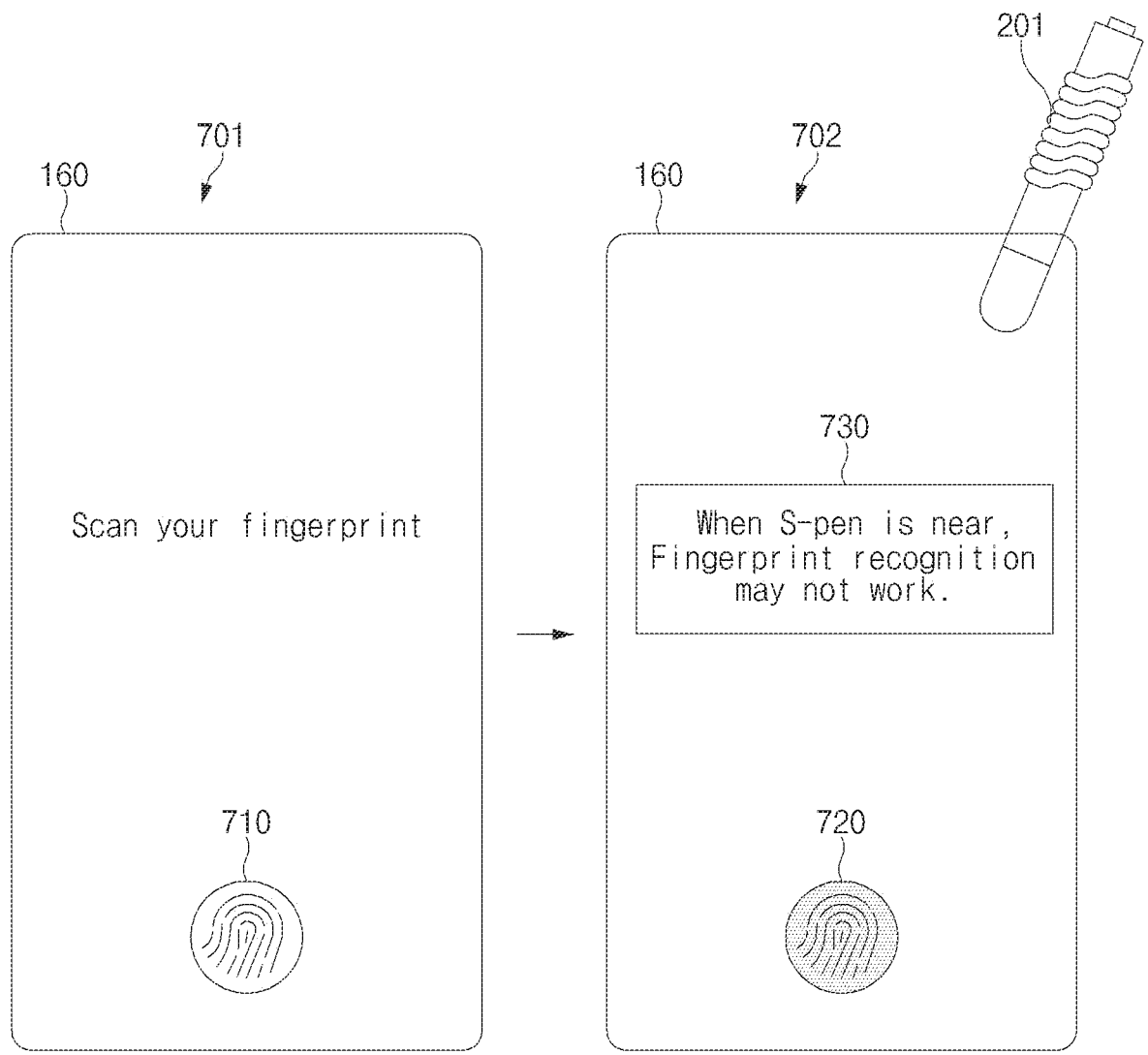
FIG. 7 is a view illustrating a screen associated with the activation of a fingerprint sensor according to an embodiment of the disclosure.

FIG. 7 is a view illustrating a screen associated with an activation of a fingerprint sensor according to an embodiment of the disclosure.

Referring to FIG. 7, the electronic device 101 in reference numeral 701 may display a first graphical user interface (GUI) 710 to guide the input of a fingerprint of the user through the display device 160 (e.g., the display), in response to detecting the attempt of the activation of the fingerprint sensor 460. The position of the display device 160 may correspond to a position at which the fingerprint sensor 460 is disposed inside the display assembly 440 (or the input detection panel 470). For example, when the fingerprint sensor 460 is disposed at the central lower end of the display assembly 440 based on an xy plane, the electronic device 101 may output the first GUI 710 to the central lower end of the display device 160.

Referring to reference numeral 702 of FIG. 7, the electronic device 101 may deactivate the fingerprint sensor 460, in response to detecting the input of the digital pen 201. The input of the digital pen 201 may include, for example, at least one of a hovering input, a drawing input, a button input, or an erasing input. According to an embodiment of the disclosure, the electronic device 101 may output, through the display device 160, a second GUI 720 indicating the fingerprint sensor 460 deactivated. For example, the electronic device 101 may output the second GUI 720 changed in at least one of the color, the size, or the transparency of the first GUI 710. For another example, the electronic device 101 may provide an effect that the first GUI 710 is disappeared from the display device 160.

According to an embodiment of the disclosure, the electronic device 101 may output, through the display device 160, a user interface 730 indicating the fingerprint sensor 460 deactivated, together with the second GUI 720. For example, the user interface 730 may have the form of a text (e.g., "When S-Pen is near, Fingerprint recognition may not work"). According to an embodiment of the disclosure, the user interface 730 may be output in a pop-up form. Although FIG. 7 illustrates an embodiment to notify a user of whether the fingerprint sensor 460 is activated, through a screen of the display device 160 according to other embodiments of the disclosure, the electronic device 101 may notify the user of the whether the fingerprint sensor 460 is activated, through a voice or a vibration.

Figure 8:
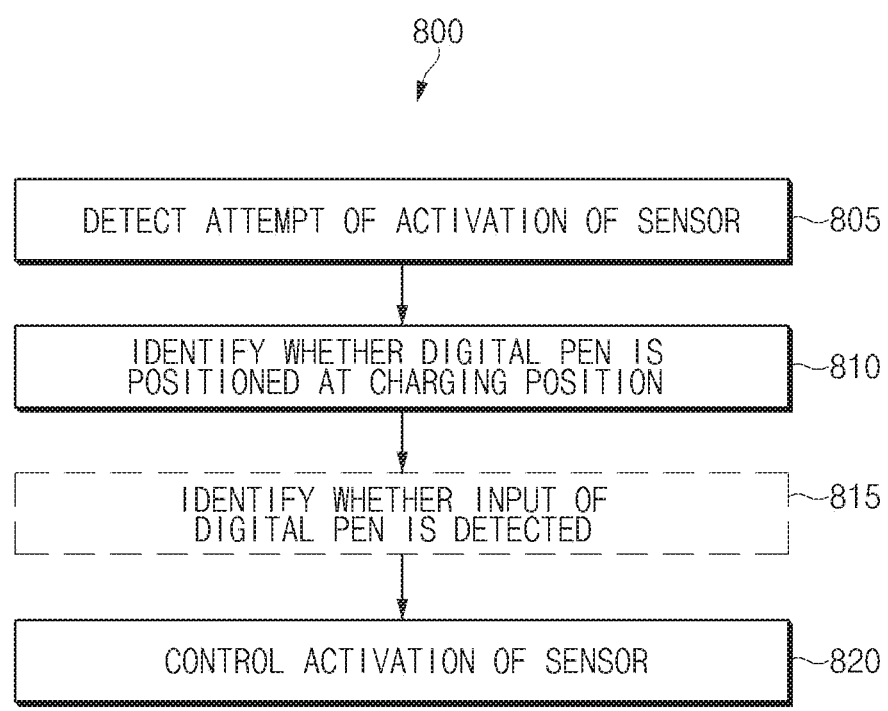
FIG. 8 is a flowchart illustrating an operation of an electronic device to control the activation of a sensor according to an embodiment of the disclosure.

FIG. 8 is a flowchart 800 illustrating an operation of an electronic device to control an activation of a sensor according to an embodiment of the disclosure.

The operations in the flowchart to be described below may be performed by the electronic device 101 or performed by the components of the electronic device 101. For example, the electronic device 101 may perform the operations in the flowchart through the processor 120 or the signal processing circuit 520. In this case, the processor 120 or the signal processing circuit 520 may perform the operations by executing instructions stored in the memory 130 of the electronic device 101.

Referring to FIG. 8, in operation 805, the electronic device 101 may detect an attempt of activation of a sensor. The sensor may include at least one of a fingerprint sensor, an image sensor, a proximity light sensor, or another sensor included in the sensor module 176 of FIG. 1. For example, a user input for an area, in which a sensor (e.g., the first GUI 710 of FIG. 7 is positioned) is included, is received, a user input for requesting the activation of the sensor is received, or an application request for requesting the activation of the sensor is received, the electronic device 101 may determine the activation of the sensor as being attempted.

In operation 810, the electronic device 101 may identify whether the digital pen 201 is positioned at a charging position. For example, when the digital pen 201 is inserted into the receiving space 112 of the electronic device 101 or attached to an external side surface of the electronic device 101, the electronic device 101 may identify the digital pen 201 as being positioned at the charging position.

According to an embodiment of the disclosure, the sequence of operation 805 and operation 810 may be changed. For example, the electronic device 101 may detect the attempt of the activation of the sensor after identifying whether the digital pen 201 is positioned at the charging position. For another example, the electronic device 101 may substantially simultaneously detect (or identify) whether the digital pen 201 is positioned at the charging position, and the attempt of the activation of the sensor.

In operation 815, the electronic device 101 may identify whether the input of the digital pen 201 is detected. The input of the digital pen 201 may include, for example, at least one of a hovering input, a drawing input, a button input, or an erasing input. According to an embodiment of the disclosure, the electronic device 101 may not perform operation 815 in the state that the digital pen 201 is positioned at the charging position and a multi-pen mode is not set.

In operation 820, the electronic device 101 may control the activation of the sensor. For example, when the digital pen 201 is positioned at the charging position and when the input of the digital pen 201 is not detected, the electronic device 101 may activate the sensor. In this case, the electronic device 101 may deactivate the charging operation for the digital pen 201 and activate the scanning operation to detect the input or position of the digital pen 201. For another example, when the input of the digital pen 201 is detected to the input detection panel 470, the electronic device 101 may not activate the sensor to maintain the usability of the digital pen 201, even though the attempt of the activation of the sensor is detected.

Figure 9:
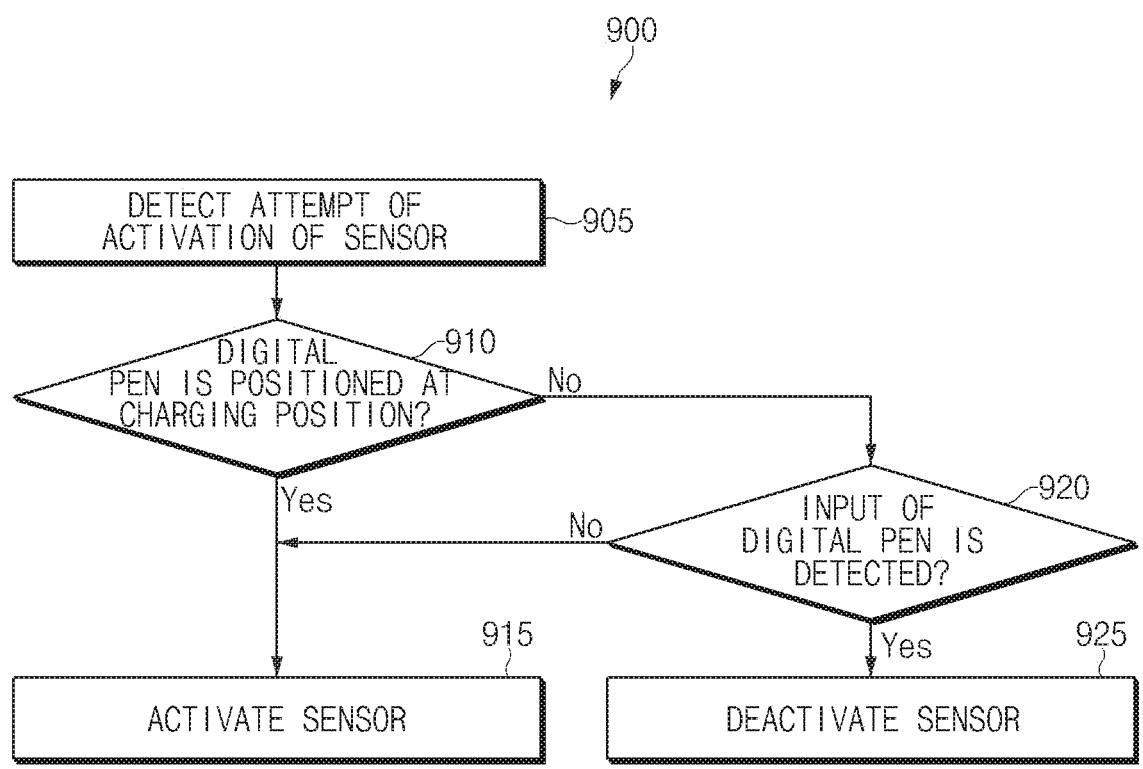
FIG. 9 is a flowchart illustrating an operation of an electronic device to control an activation of a sensor according to an embodiment of the disclosure.

FIG. 9 is a flowchart 900 illustrating an operation of an electronic device to control an activation of a sensor according to an embodiment of the disclosure.

FIG. 9 illustrates an embodiment when the electronic device 101 operates in a single pen mode. The embodiment associated with the multi-pen mode will be described with reference to FIGS. 19 and 20.

Referring to FIG. 9, in operation 905, the electronic device 101 may detect an attempt of activation of a sensor.

In operation 910, the electronic device 101 may identify whether the digital pen 201 is positioned at a charging position (e.g., operation 810 of FIG. 8). For example, when the digital pen 201 is positioned at the charging position, the electronic device 101 may activate the sensor, in operation 915. In this case, the electronic device 101 may deactivate the charging operation for the digital pen 201 to prevent the recognition rate of the sensor from being degraded.

When the digital pen 201 is not positioned at the charging position, in operation 920, the electronic device 101 may identify whether the input of the digital pen 201 is detected. When the input of the digital pen 201 is not detected, the electronic device 101 may activate the sensor, in operation 915. When the input of the digital pen 201 is detected, the electronic device 101 may deactivate the sensor, in operation 925. For another example, the electronic device 101 may deactivate the sensor, may not capture an image (e.g., a fingerprint image) even if the sensor is activated, or may not use the captured image even if the image is captured. In this case, the electronic device 101 may output the second GUI 720 or the user interface 730 as illustrated in reference numeral 702 of FIG. 7.

Figure 10:
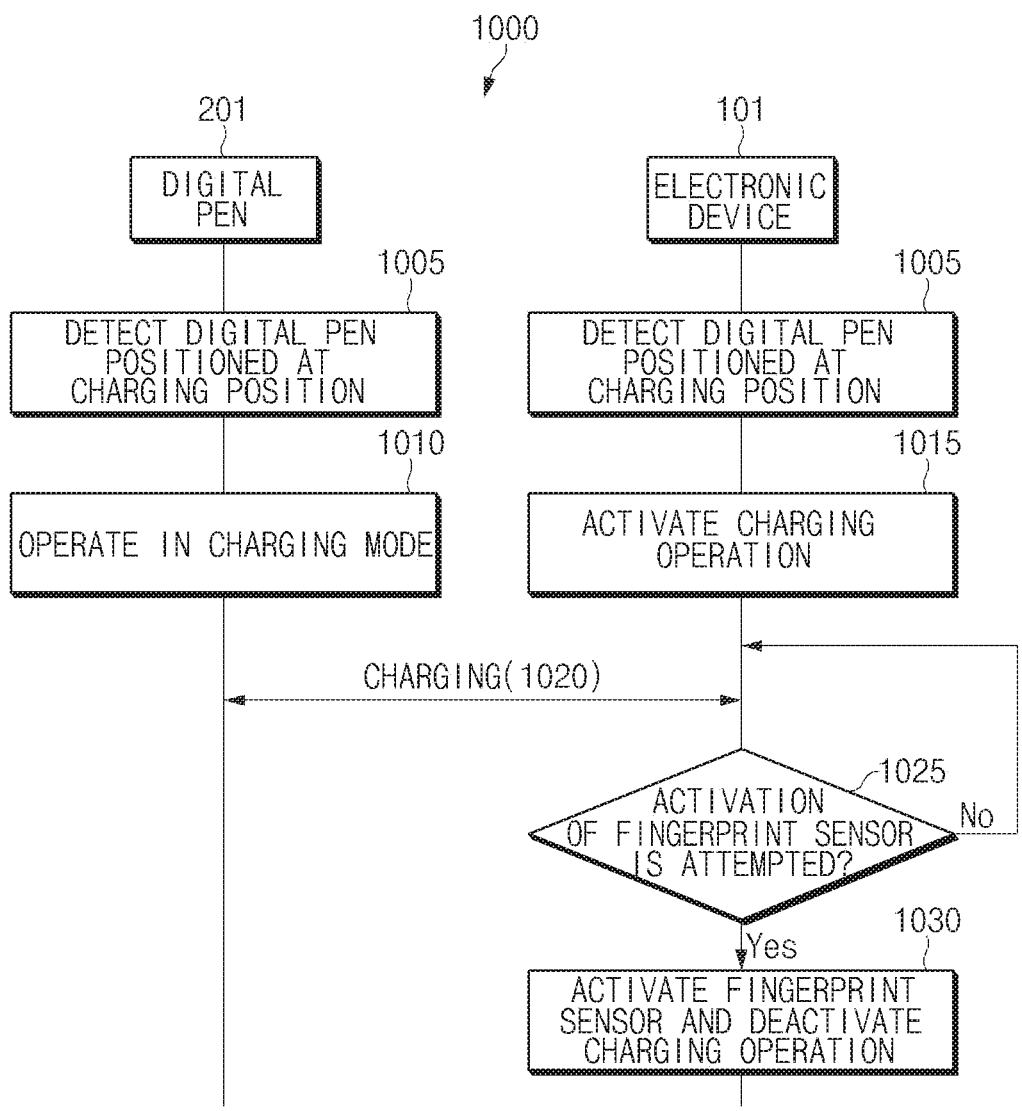
FIG. 10 illustrates a flowchart of operations of a digital pen and an electronic device to perform a charging operation according to an embodiment of the disclosure.

FIG. 10 illustrates a flowchart 1000 of an operation of a digital pen and an electronic device to perform a charging operation according to an embodiment of the disclosure.

Referring to FIG. 10, in operation 1005, the digital pen 201 and the electronic device 101 may detect that the digital pen 201 is positioned at a charging position. For example, the digital pen 201 may detect a signal transmitted from the conductive coil 510 of the electronic device 101 or may detect that the digital pen 201 is positioned at the charging position through a sensor (e.g., a motion sensor or a hall sensor).

In operation 1010, the digital pen 201 may operate in a charging mode. For example, the digital pen 201 may activate the resonance circuit 287 and the charging circuit 288 to receive the charging signal from the electronic device 101. According to an embodiment of the disclosure, the digital pen 201 may turn off the function of the motion sensor (e.g., the trigger circuit 298 of FIG. 3) during the operation in the charging mode.

In operation 1015, the electronic device 101 may activate the charging operation. For example, the electronic device 101 may activate the transmit path (e.g., the first path 530-1 of FIG. 5, the first transmit path 610-1 of FIG. 6, or the second transmit path 610-2 of FIG. 6) to transmit the charging signal to the digital pen 201.

In operation 1020, the digital pen 201 and the electronic device 101 may perform the charging operation. For example, the electronic device 101 may transmit a charging signal to the digital pen 201 through the activated transmit path. The digital pen 201 may rectify the charging signal received from the electronic device 101, through the resonance circuit 287 and may apply the rectified signal to the battery 289.

In operation 1025, the electronic device 101 may identify whether the attempt of the activation of the fingerprint sensor 460 is detected, during charging. When the attempt of the activation is not detected, the electronic device 101 may repeatedly perform operation 1020 and operation 1025.

When the attempt of the activation of the fingerprint sensor 460 is detected, in operation 1030, the electronic device 101 may activate the fingerprint sensor 460 and may deactivate the charging operation.

FIGS. 11 to 14 illustrate that the electronic device 101 operates in a dual transmit (Tx) mode or a single Tx mode. In the disclosure, the dual Tx mode may refer to the operation in which a plurality of transmit paths are activated, and the single Tx mode may refer to the operation in which some of the plurality of transmit paths are deactivated. The electronic device 101 may prevent the performance of the fingerprint sensor 460 from being deteriorated through the single transmit mode while charging the digital pen 201 with lower power or performing the scanning operation.

Figure 11:
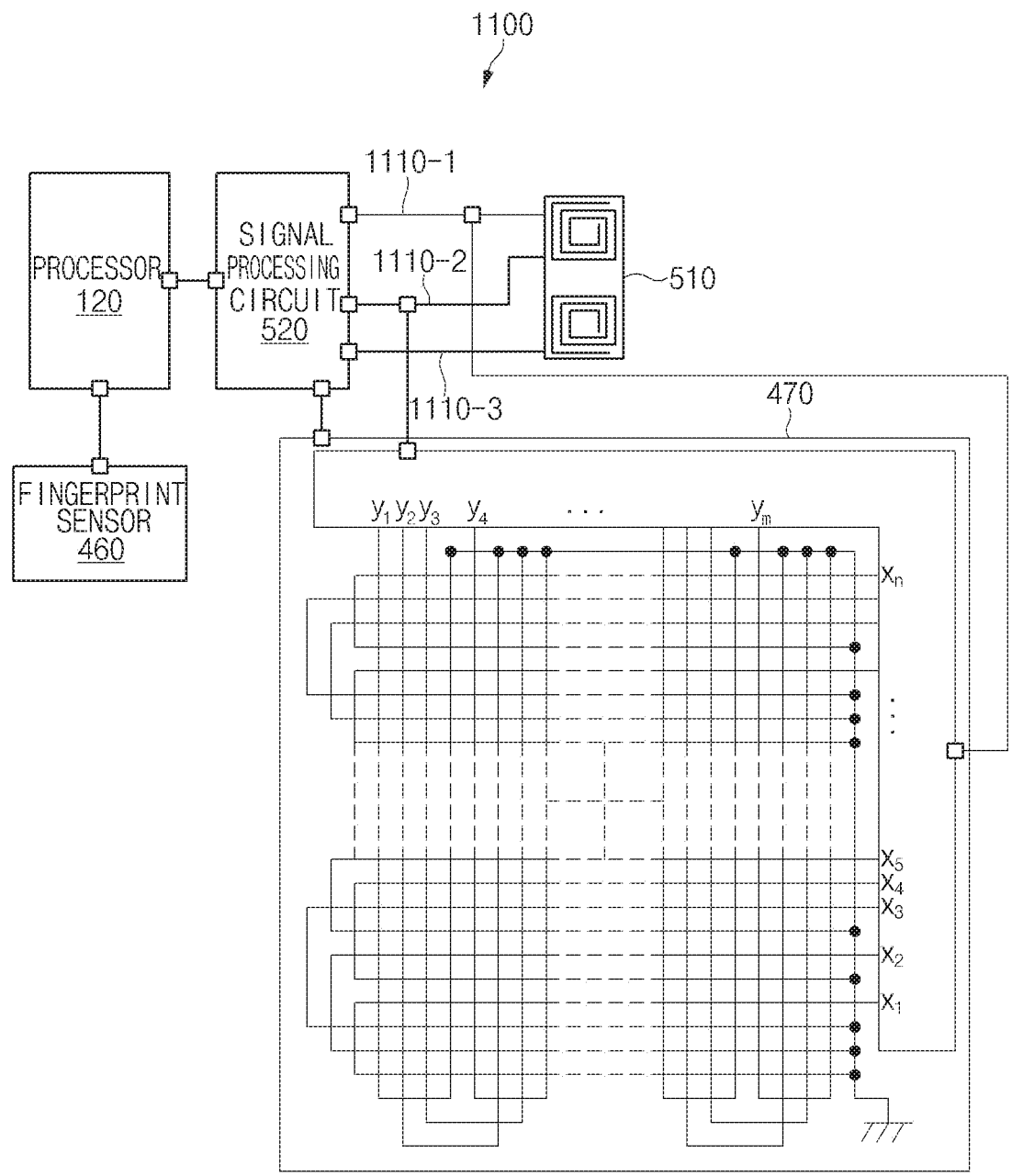
FIG. 11 is a block diagram of an electronic device including a input detection panel and a fingerprint sensor according to an embodiment of the disclosure.

FIG. 11 is a block diagram 1100 illustrating an electronic device including an input detection panel and a fingerprint sensor according to an embodiment of the disclosure.

Figure 12:
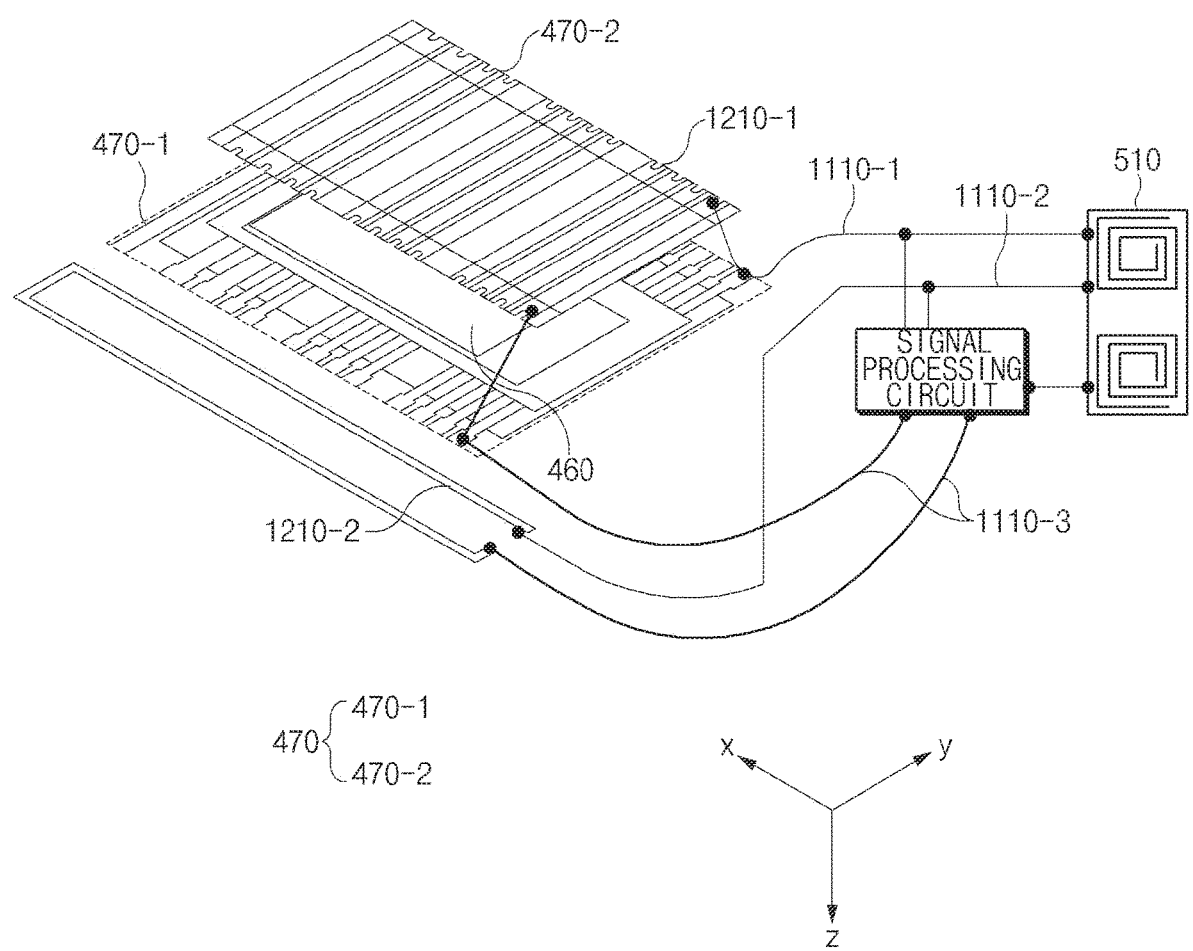
FIG. 12 illustrates a structure of a conductive coil connected to a first conductive pattern and a second conductive pattern according to an embodiment of the disclosure.

FIG. 12 illustrates a structure of a conductive coil connected with a first conductive pattern and a second conductive pattern according to an embodiment of the disclosure.

Referring to FIG. 11, the signal processing circuit 520, the conductive coil 510, and the input detection panel 470 may be electrically connected with each other through a first transmit path 1110-1, a second transmit path 1110-2, and a receive path 1110-3. According to an embodiment of the disclosure, the first transmit path 1110-1 and the second transmit path 1110-2 may be connected with conductive patterns corresponding to mutually different axes based on xy coordinates. For example, the input detection panel 470 may be configured with first conductive patterns (e.g., $x_1$, $x_2$, $x_3$, $x_4$, ..., and $x_n$) to detect x axis coordinates, and second conductive patterns (e.g., $y_1$, $y_2$, $y_3$, $y_4$, ..., and $y_m$) to detect y axis coordinates. The first transmit path 1110-1 may be connected with the first conductive patterns, and the second transmit path 1110-2 may be connected with the second conductive patterns.

For example, referring to FIG. 12, a first conductive pattern 1210-1 may correspond to some of the first conductive patterns (e.g., $x_1$, $x_2$, $x_3$, $x_4$, ..., and $x_n$) of FIG. 11, and a second conductive pattern 1210-2 may correspond to some of the second conductive patterns (e.g., $y_1$, $y_2$, $y_3$, $y_4$, ..., and $y_m$). The second conductive pattern 1210-2 may be included in the first panel 470-1, and may not be included in the second panel 470-2. The conductive coil 510 may be connected with the first conductive pattern 1210-1 through the first transmit path 1110-1, and connected with the second conductive pattern 1210-2 through the second transmit path 1110-2. The conductive coil 510 may be connected with the first conductive pattern 1210-1 and the second conductive pattern 1210-2 through the receive path 1110-3.

According to an embodiment of the disclosure, the signal processing circuit 520 (or the processor 120) may operate in the dual Tx mode or the single Tx mode. In the dual Tx mode, the signal processing circuit 520 may output a transmit signal through a plurality of transmit paths by activating both the first transmit path 1110-1 and the second transmit path 1110-2. In the single Tx mode, the signal processing circuit 520 may deactivate one of the first transmit path 1110-1 or the second transmit path 1110-2. For example, when the fingerprint sensor 460 is activated, the signal processing circuit 520 may deactivate the first transmit path 1110-1 to prevent the interference between the second panel 470-2 disposed at a position adjacent to the fingerprint sensor 460, and the fingerprint sensor 460. In this case, the activated second transmit path 1110-2 may be used for a scanning operation.

Figure 13:
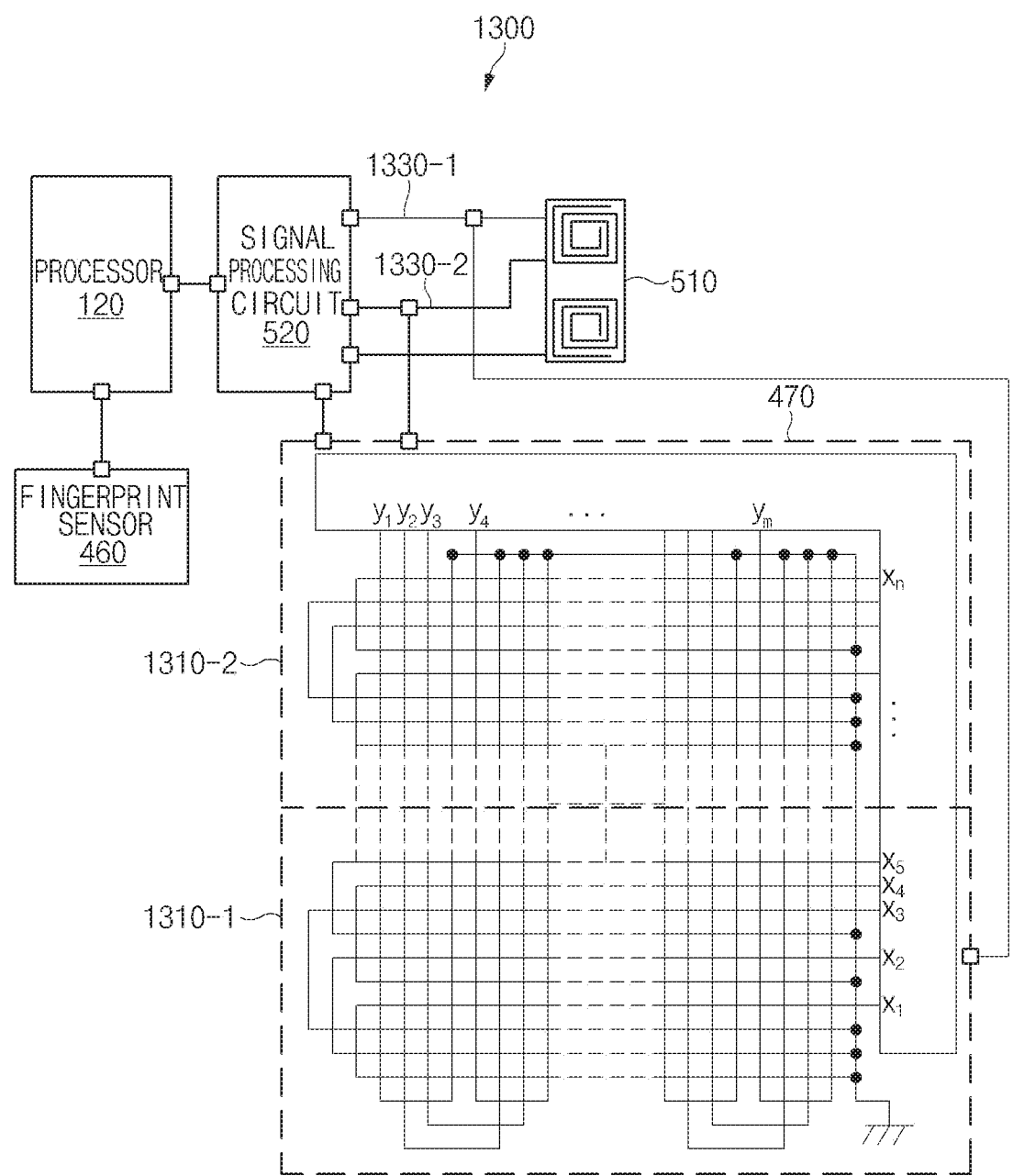
FIG. 13 is a block diagram of an electronic device including a input detection panel and a fingerprint sensor according to an embodiment of the disclosure.

FIG. 13 is a block diagram 1300 illustrating an electronic device including an input detection panel and a fingerprint sensor according to an embodiment of the disclosure.

Referring to FIG. 13, the input detection panel 470 may include a first area 1310-1 including an area in which the fingerprint sensor 460 is disposed, and a second area 1310-2 except for the first area 1310-1. For example, when the fingerprint sensor 460 is disposed in the lower end of the input detection panel 470 based on the xy plane, the first area 1310-1 may include the lower end of the input detection panel 470 and the second area 1310-2 may include an upper end of the input detection panel 470. Although FIG. 13 shows an example in which an area of the first area 1310-1 is substantially equal to an area of the second area 1310-2, the ratio between areas may be varied depending on the size and the position of the fingerprint sensor 460 disposed in the input detection panel 470.

According to an embodiment of the disclosure, a first transmit path 1330-1 and a second transmit path 1330-2 may be connected with mutually different areas of the input detection panel 470. For example, the first transmit path 1330-1 may be connected with the first area 1310-1, and the second transmit path 1330-2 may be connected with the second area 1310-2.

According to an embodiment of the disclosure, in the dual Tx mode, the signal processing circuit 520 (or the processor 120) may output a transmit signal through a plurality of transmit paths by activating both the first transmit path 1330-1 and the second transmit path 1330-2. In the single Tx mode, the signal processing circuit 520 may deactivate one of the first transmit path 1330-1 or the second transmit path 1330-2. For example, when the fingerprint sensor 460 is activated, the signal processing circuit 520 may deactivate the first transmit path 1330-1 to prevent the interference between conductive patterns of the first area 1310-1 including an area in which the fingerprint sensor 460 is disposed, and the fingerprint sensor 460. In this case, the activated second transmit path 1330-2 may be used for a scanning operation.

Figure 14:
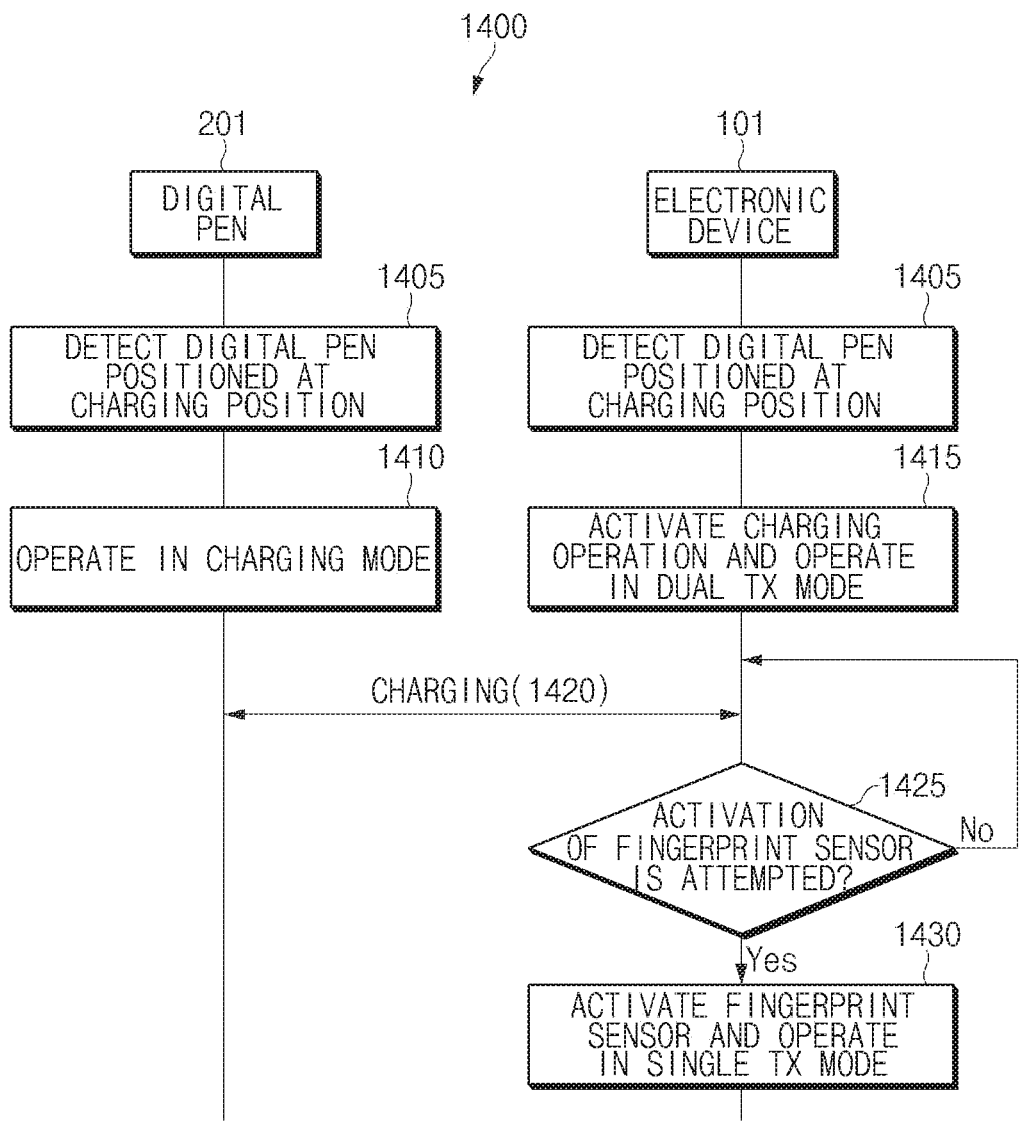
FIG. 14 illustrates a flowchart of operations of a digital pen and an electronic device according to an embodiment of the disclosure.

FIG. 14 illustrates a flowchart 1400 of an operation of a digital pen and an electronic device according to an embodiment of the disclosure.

Referring to FIG. 14, in operation 1405, the digital pen 201 and the electronic device 101 may detect that the digital pen 201 is positioned at a charging position. In operation 1410, the digital pen 201 may operate in a charging mode (e.g., operation 1010 of FIG. 10).

In operation 1415, the electronic device 101 may activate the charging operation and may operate in the dual Tx mode. For example, the electronic device 101 may activate both the first transmit path 1330-1 and the second transmit path 1330-2 to transmit the charging signal to the digital pen 201.

In operation 1420, the digital pen 201 and the electronic device 101 may perform the charging operation (e.g., operation 1020 of FIG. 10). In operation 1425, the electronic device 101 may identify whether the attempt of the activation of the fingerprint sensor 460 is detected during charging. When the attempt of the activation is not detected, the electronic device 101 may repeatedly perform operation 1420 and operation 1425.

When attempt of the activation of the fingerprint sensor 460 is detected, in operation 1430, the electronic device 101 may activate the fingerprint sensor 460 and change the dual Tx mode to the single Tx mode. For example, the electronic device 101 may deactivate the first transmit path 1330-1 connected with the first conductive patterns to detect the x axis coordinates or connected with the first area 1310-1 in which the fingerprint sensor 460 is disposed.

FIGS. 15 to 18 illustrate embodiments that the electronic device 101 includes a third panel 470-3. In the disclosure, the third panel 470-3 may be referred to as a null panel. The electronic device 101 may prevent the performance of the fingerprint sensor 460 from being deteriorated while charging the digital pen 201 with lower power or performing the scanning operation, by cancelling a portion of a signal generated from the input detection panel 470 through the third panel 470-3.

Figure 15:
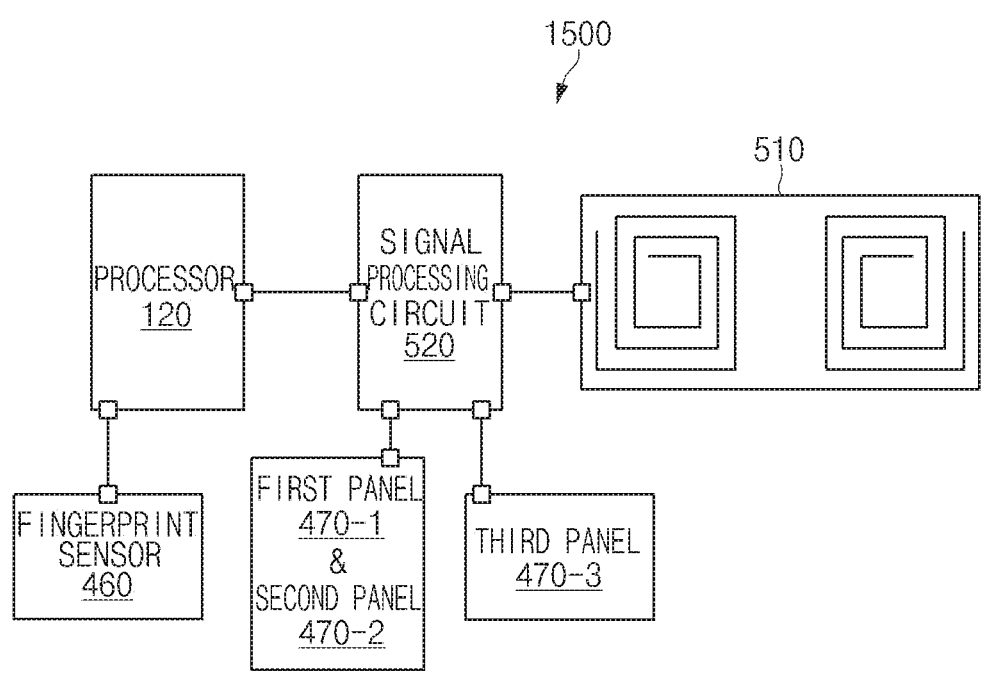
FIG. 15 illustrates a block diagram of an electronic device including a third panel according to an embodiment of the disclosure.

FIG. 15 is a block diagram 1500 of an electronic device including a third panel according to an embodiment of the disclosure.

Referring to FIG. 15, the electronic device 101 may further include the third panel 470-3 electrically connected with the signal processing circuit 520. Although the third panel 470-3 has the structure similar to the structure of the first panel 470-1 or the second panel 470-2, the third panel 470-3 may have the structure in which a coil is wound in a direction opposite to the winding direction of a coil of the first panel 470-1 or the second panel 470-2. For the convenience of explanation, although FIG. 15 shows an example that the third panel 470-3 is displayed as a block separate from the first panel 470-1 and the second panel 470-2, the third panel 470-3 may be included in the input detection panel 470 together with the first panel 470-1 and the second panel 470-2.

According to an embodiment of the disclosure, the signal processing circuit 520 (or the processor 120) may generate a magnetic field having a direction opposite to directions of the magnetic fields of the first panel 470-1 and the second panel 470-2, through the third panel 470-3.

Figure 16:
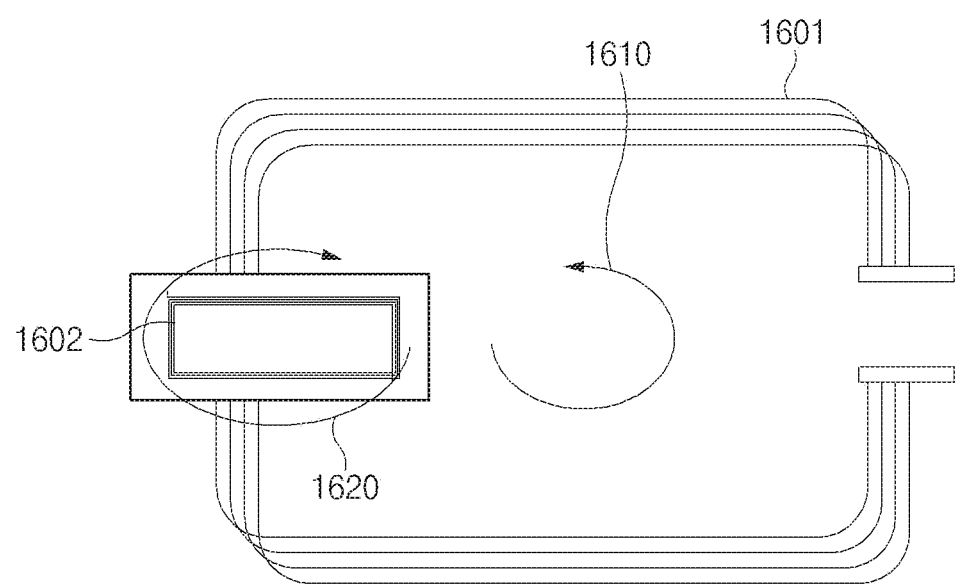
FIG. 16 illustrates a structure of a third panel included in a input detection panel according to an embodiment of the disclosure.

FIG. 16 illustrates a structure of a third panel included in an input detection panel according to an embodiment of the disclosure.

Referring to FIG. 16, a first conductive coil 1601 and a second conductive coil 1602 may have pattern structures having a loop shape. The second conductive coil 1602 constituting the third panel 470-3 may be disposed at a position overlapped with a portion of the first conductive coil 1601 constituting the first panel 470-1 or the second panel 470-2, to prevent the performance of the fingerprint sensor 460 from being deteriorated. According to an embodiment of the disclosure, the first conductive coil 1601 and the second conductive coil 1602 may be disposed at different layers among a plurality of layers constituting the input detection panel 470.

According to an embodiment of the disclosure, the second conductive coil 1602 may be wound in a direction opposite to the winding direction of the first conductive coil 1601. For example, when the first conductive coil 1601 is wound in a first direction 1610 (e.g., counterclockwise), the second conductive coil 1602 may be wound in the second direction 1620 (e.g., clockwise) opposite to the first direction 1610.

Figure 17:
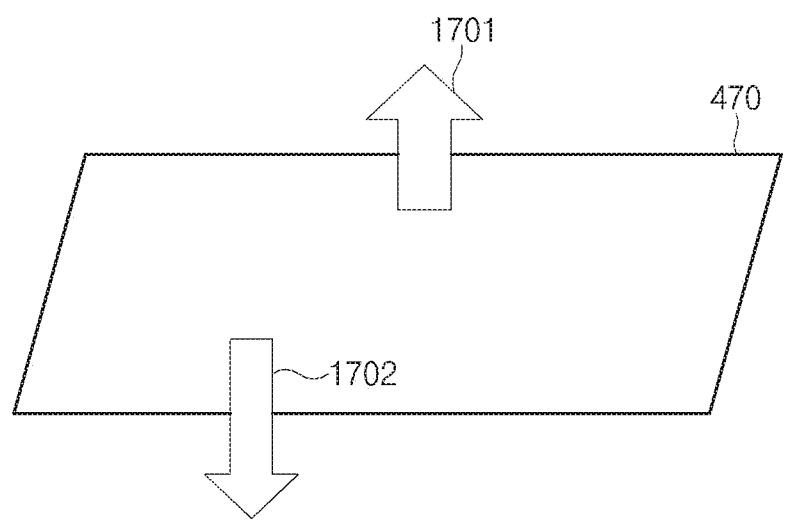
FIG. 17 illustrates a direction of a magnetic field of an input detection panel according to an embodiment of the disclosure.

FIG. 17 illustrates a direction of a magnetic field of input detection panel according to an embodiment of the disclosure.

Referring to FIG. 17, a first magnetic field 1701 may refer to a magnetic field generated from the first conductive coil 1601 of FIG. 16, and a second magnetic field 1702 may refer to a magnetic field generated from the second conductive coil 1602 of FIG. 16. The second magnetic field 1702 cancels a portion of the first magnetic field 1701. Accordingly, the electronic device 101 may reduce the influence of the magnetic field, which is output from the input detection panel 470, on the fingerprint sensor 460.

Figure 18:
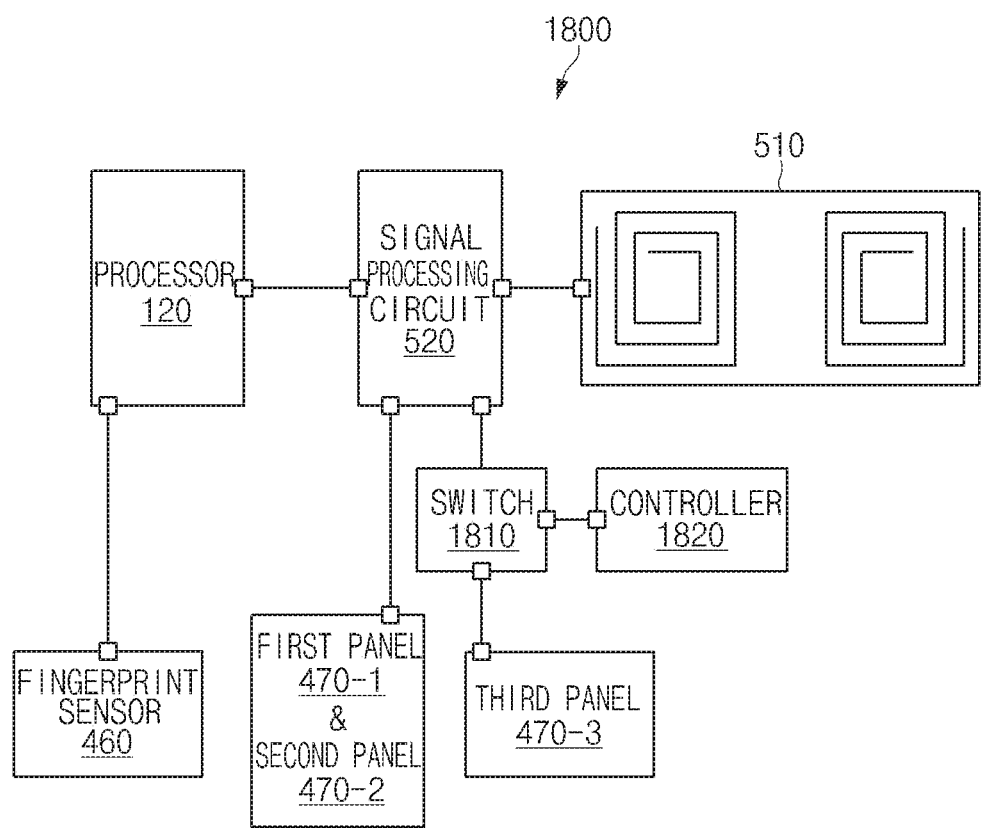
FIG. 18 illustrates a block diagram of an electronic device including a third panel and a switch according to an embodiment of the disclosure.

FIG. 18 is a block diagram 1800 illustrating an electronic device including a third panel and a switch according to an embodiment of the disclosure.

Referring to FIG. 18, the electronic device 101 may further include the switch 1810 electrically connected with the third panel 470-3, and a controller 1820 electrically connected with the switch 1810. According to an embodiment of the disclosure, the controller 1820 may control the activation of the third panel 470-3 through the switch 1810. For example, when activation of the fingerprint sensor 460 is attempted, the controller 1820 may generate an offset signal by controlling the switch 1810 to connect the third panel 470-3 with the signal processing circuit 520. For another example, when the fingerprint sensor 460 is deactivated or the input of the digital pen 201 is detected, the controller 1820 may control the switch 1810 not to connect the third panel 470-3 with the signal processing circuit 520 such that the usability of the digital pen 201 is maintained.

Although FIG. 18 illustrates the controller 1820, which is separate, the electronic device 101 does not include the controller 1820, or may include the controller 1820 provided in the signal processing circuit 520 or the processor 120 according to another embodiment. In this case, the switch 1810 may be operated by the signal processing circuit 520 or the processor 120.

Figure 19:
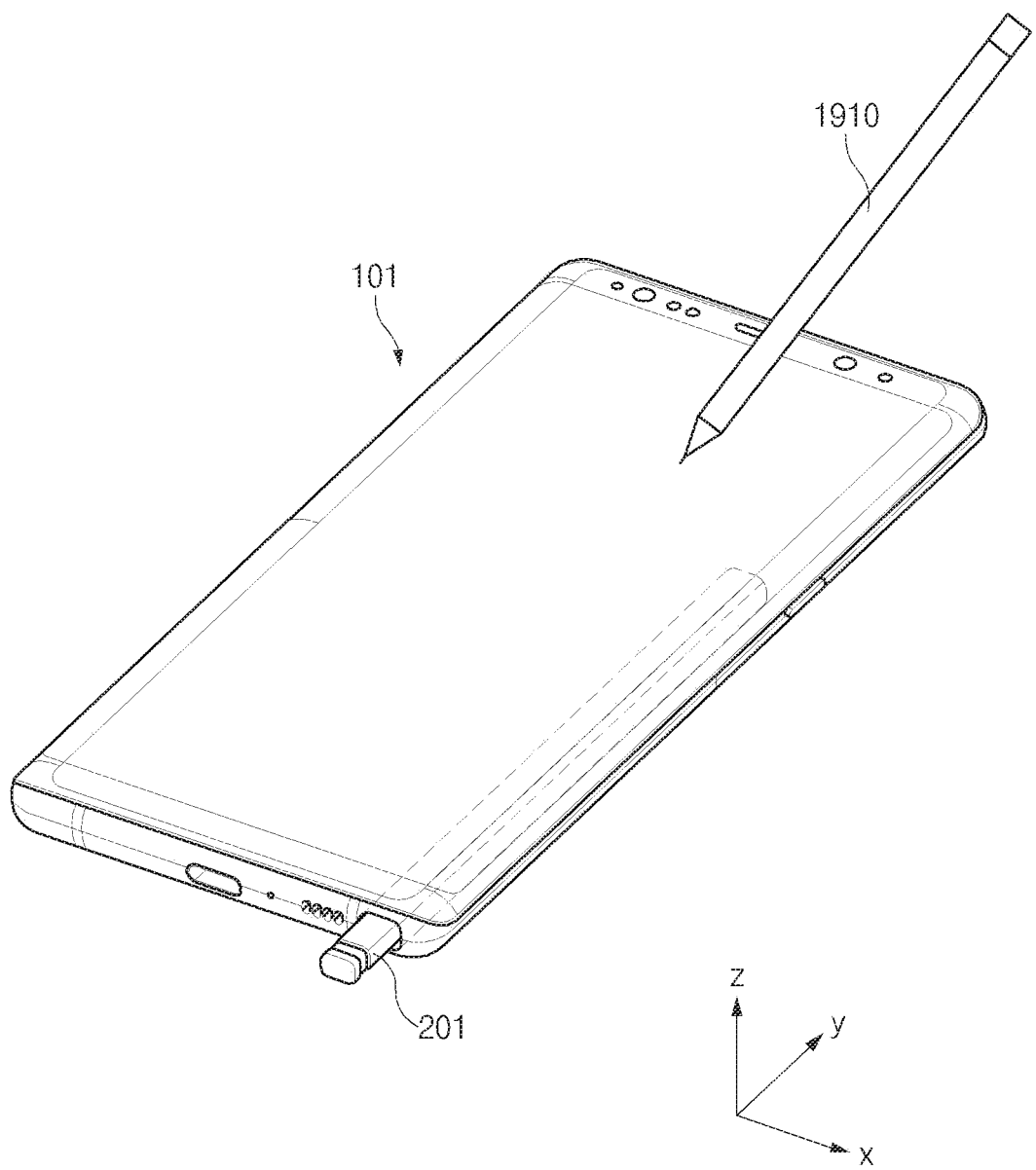
FIG. 19 illustrates an environment in which an electronic device operates together with a plurality of digital pens according to an embodiment of the disclosure.
Figure 20:
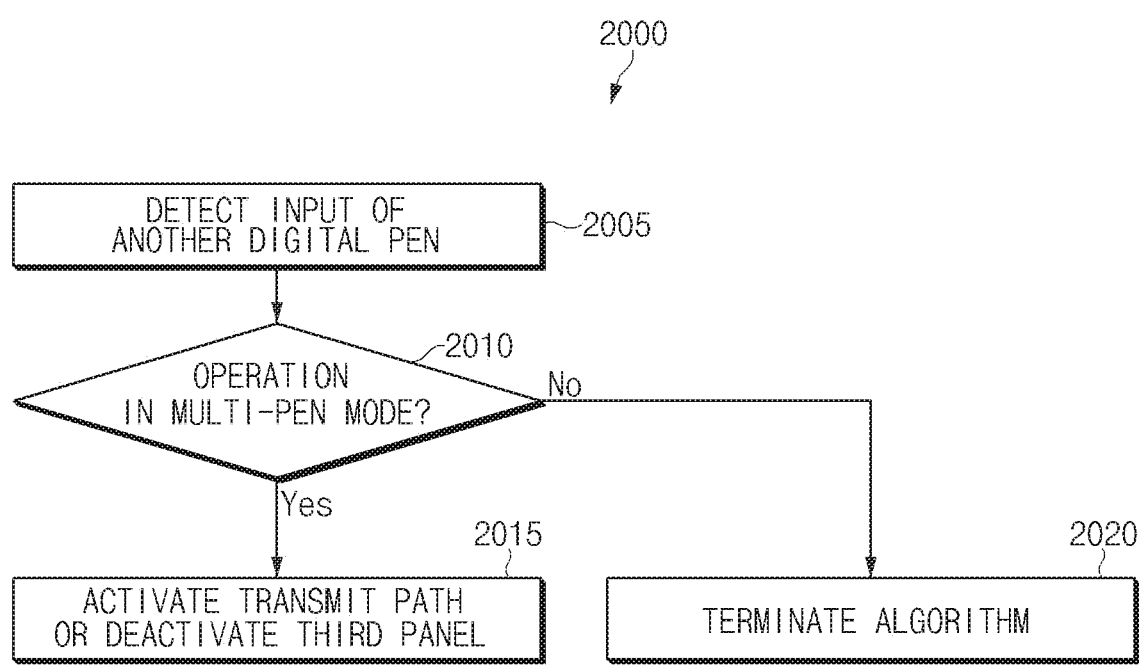
FIG. 20 illustrates a flowchart of an operation of an electronic device operating together with a plurality of digital pens according to an embodiment of the disclosure.

FIGS. 19 and 20 illustrate an operation of the electronic device 101 under an environment in which a plurality of digital pens 201 and 1910 are used according to various embodiments of the disclosure.

FIG. 19 illustrates an environment in which an electronic device operates together with a plurality of digital pens according to an embodiment of the disclosure. FIG. 20 illustrates a flowchart 2000 of an operation of an electronic device according to an embodiment of the disclosure.

Referring to FIG. 19, the electronic device 101 may receive an input from another digital pen 1910 (or second digital pen 1910) when the digital pen 201 (or first digital pen 201) is positioned at the charging position, and the fingerprint sensor 460 is activated. The input of the second digital pen 1910 may include, for example, at least one of a hovering input, a drawing input, a button input, or an erasing input.

When the input of the second digital pen 1910 is detected, the electronic device 101 may activate the transmit path (e.g., the first transmit path 1110 of FIG. 11) which is deactivated, or may deactivate the third panel 470-3 which is activated, such that the usability of the second digital pen 1910 is maintained.

Referring to FIG. 20, the operation flowchart 2000 may be performed, for example, after operation 820 of FIG. 8, operation 915 of FIG. 9, operation 1030 of FIG. 10, or operation 1430 of FIG. 14.

In operation 2005, the electronic device 101 may detect the input of the second digital pen 1910 while the first digital pen 201 is positioned at the charging position.

In operation 2010, the electronic device 101 may identify whether the electronic device 101 is operating in a multi-pen mode. The multi-pen mode may refer to that the electronic device 101 is able to support a plurality of digital pens (e.g., 201 and 1910). According to an embodiment of the disclosure, the multi-pen mode may be set based on a user input or may be set in a manufacturing stage of the electronic device 101.

When the electronic device 101 operates in the multi-pen mode, in operation 2015, the electronic device 101 may activate the transmit path (e.g., the first transmit path 1110-1 of FIG. 11) which is deactivated, or may deactivate the third panel 470-3 which is activated, thereby ensuring the usability of the second digital pen 1910.

When the electronic device 101 does not operate in the multi-pen mode, in operation 2020, the electronic device 101 does not need to ensure the usability of the second digital pen 1910. Accordingly, the electronic device 101 may terminate an algorithm.

As described above, according to various embodiments of the disclosure, an electronic device (e.g., the electronic device 101 of FIG. 4) may include a display (e.g., at least a portion of the display device 160 of FIG. 1 or the display assembly 440 of FIG. 4), a input detection panel (e.g., the input detection panel 470 of FIG. 4) to detect an input of a digital pen (e.g., the digital pen 201 of FIG. 4), a sensor disposed to be overlapped with the display and the input detection panel, when the display is viewed from a top, and at least one processor (e.g., the processor 120 of FIG. 1 or the signal processing circuit 520 of FIG. 5) operatively connected with the display, the input detection panel, and the sensor. The at least one processor may be configured to detect an attempt of activation of the sensor, activate the sensor and control at least a portion of a charging operation through the input detection panel, when the digital pen is positioned at a charging position, identify whether the input of the digital pen is detected, when the digital pen is not positioned at the charging position, deactivate the sensor, when the input of the digital pen is detected, or activate the sensor, when the input of the digital pen is not detected.

According to an embodiment of the disclosure, the at least one processor may be configured to detect the attempt of the activation of the sensor, when a user input is received onto an area, which corresponds to a position of the sensor, a user input for requesting the activation of the sensor is received, or an application request for requesting the activation of the sensor is received, on the display According to an embodiment of the disclosure, the at least one processor may be configured to output, to the display, a first graphical user interface (GUI) (e.g., the first GUI 710 of FIG. 7) to guide an input of a user, in response to that the sensor is activated, and output, to the display, a second GUI (e.g., the second GUI 720 of FIG. 7) indicating that the sensor is deactivated, in response to that the sensor is deactivated.

According to an embodiment of the disclosure, the at least one processor may be configured to activate the charging operation, in response to detecting that the digital pen is positioned at the charging position, and deactivate the charging operation, in response to detecting the attempt of the activation of the sensor after the charging operation is activated.

According to an embodiment of the disclosure, the display may further include a conductive coil (e.g., the conductive coil 510 of FIG. 5) to generate a charging signal for charging a battery of the digital pen, and the sensor may be disposed to be overlapped with an opening (e.g., the opening 540 of FIG. 5) formed in a partial area of a first input detection panel (e.g., the first panel 470-1 of FIG. 5) included in the input detection panel, and a rear surface of the sensor may be disposed to be overlapped with at least a portion of a second input detection panel (e.g., the second panel 470-2 of FIG. 5) included in the sensing panel.

According to an embodiment of the disclosure, the input detection panel may include first conductive patterns to detect a first axis on xy plane, and second conductive patterns to detect a second axis different from the first axis on the xy plane. The at least one processor may be configured to activate a first transmit path (e.g., the first transmit path 1110-1 of FIG. 11) connected with the first axis and a second transmit path (e.g., the second transmit path 1110-2 of FIG. 11) connected with the second axis, in response to detecting that the digital pen is positioned at the charging position, and deactivate one transmit path of the first transmit path or the second transmit path, in response to detecting the attempt of the activation of the sensor after detecting that the digital pen is positioned at the charging position.

According to an embodiment of the disclosure, the input detection panel may include a first area (e.g., the first area 1310-1 of FIG. 13) at least partially overlapped with the fingerprint sensor and a second area (e.g., the second area 1310-2 of FIG. 13) except for the first area, when the display is viewed from a top. The at least one processor may be configured to activate a first transmit path connected with the first area and a second transmit path connected with the second area, in response to detecting that the digital pen is positioned at the charging position, and deactivate the first transmit path, in response to that the attempt of the activation of the sensor is detected after detecting that the digital pen is positioned at the charging position.

According to an embodiment of the disclosure, the electronic device may further include a third input detection panel (e.g., the third panel 470-3 of FIG. 13) disposed at a position at least partially overlapped with the second input detection panel, and a conductive coil (e.g., the second conductive coil 1602 of FIG. 16) of the third input detection panel may be configured to be wound in a direction opposite to a direction in which a conductive coil of the second input detection panel is wound.

According to an embodiment of the disclosure, the electronic device may further include a switch (e.g., the switch 1810 of FIG. 18) disposed at a position adjacent to the third sensing panel, and the at least one processor may be configured to control the switch such that the third input detection panel is not activated, in response to detecting that the digital pen is positioned at the charging position, and to control the switch such that the third input detection panel is activated, in response to that the attempt of the activation of the sensor is detected after detecting that the digital pen is positioned at the charging position.

According to an embodiment of the disclosure, the at least one processor may be configured to control the switch such that the third input detection panel is not activated, in response to that an input of another digital pen (e.g., the second digital pen 1910 of FIG. 19) different from the digital pen.

As described above, according to various embodiments of the disclosure, a method of an electronic device may include detecting an attempt of activation of a sensor, activating the sensor and controlling at least a portion of a charging operation, when a digital pen is positioned at a charging position, identifying whether an input of the digital pen is detected, when the digital pen is not positioned at the charging position, deactivating the sensor, when the input of the digital pen is detected, and activating the sensor, when the input of the digital pen is not detected.

According to an embodiment of the disclosure, the method may further include outputting a first graphical user interface (GUI) to guide an input of a user, in response to that the sensor is activated, and outputting a second GUI indicating that the sensor is deactivated, in response to that the sensor is deactivated.

According to an embodiment of the disclosure, the method may include activating the charging operation, in response to detecting that the digital pen is positioned at the charging position, and the controlling of at least the portion of the charging operation may include deactivating the charging operation, in response to that the attempt of the activation of the sensor is detected.

According to an embodiment of the disclosure, the method may further include performing a dual Tx mode to output a signal through a plurality of transmit paths, in response to detecting that the digital pen is positioned at the charging position, and the controlling of at least the portion of the charging operation may include performing a single Tx mode to activate only one transmit path of the plurality of transmit paths, in response to detecting the attempt of the activation of the sensor.

According to an embodiment of the disclosure, the method may further include detecting an input of another digital pen different form the digital pen and performing the dual Tx mode, when the electronic device supports the digital pen and the another digital pen.

As described above, an electronic device (e.g., the electronic device 101 of FIG. 4) may include a display (e.g., at least a portion of the display device 160 or the display assembly 440 of FIG. 4), a input detection panel (e.g., the input detection panel 470 of FIG. 4) to detect an input of a digital pen (e.g., the digital pen 201 of FIG. 4), a fingerprint sensor (the fingerprint sensor 460 of FIG. 4) disposed to be overlapped with the display and the input detection panel, when the display is viewed from a top, and at least one processor (e.g., the processor 120 of FIG. 1 or the signal processing circuit 520 of FIG. 5) operatively connected with the display, the input detection panel, and the fingerprint sensor. The at least one processor may be configured to detect an attempt of activation of the fingerprint sensor, output, to the display, a first graphical user interface (GUI) (e.g., the first GUI 710 of FIG. 7) to guide a fingerprint input of a user, in response to detecting that the fingerprint sensor is activated, and detect the input of the digital pen on the display, and output, to the display, a second GUI (e.g., the second GUI 720 of FIG. 7) indicating that the fingerprint sensor is deactivated, in response to that the input of the digital pen is detected.

According to an embodiment of the disclosure, the at least one processor may be configured to: activate a charging operation, when detecting that the digital pen is positioned at the charging position, deactivate the charging operation and activate the fingerprint sensor, when the attempt of the activation of the fingerprint sensor is detected, and deactivate the fingerprint sensor, when the input of the digital pen or another digital pen different form the digital pen is detected.

According to an embodiment of the disclosure, the at least one processor may be configured to detect the attempt of the activation of the fingerprint sensor, when a user input is received onto an area, which corresponds to a position of the sensor, a user input for requesting the activation of the fingerprint sensor is received, or an application request for requesting the activation of the fingerprint sensor is received, on the display.

According to an embodiment of the disclosure, the input detection panel may include first conductive patterns configured to detect a first axis on an xy plane, and second conductive patterns configured to detect a second axis different from the first axis on the xy plane. The at least one processor may be configured to: activate a first transmit path (e.g., the first transmit path 1110-1 of FIG. 11) connected with the first axis and a second transmit path (e.g., the second transmit path 1110-2 of FIG. 11) connected with the second axis, in response to detecting that the digital pen is positioned at the charging position, and deactivate one transmit path of the first transmit path or the second transmit path, in response to detecting the attempt of the activation of the fingerprint sensor.

According to an embodiment of the disclosure, the input detection panel may include a first area (e.g., the first area 1310-1 of FIG. 13) at least partially overlapped with the fingerprint sensor, when the display is viewed from a top, and a second area (e.g., the second area 1310-2 of FIG. 13) except for the first area. The at least one processor may be configured to activate a first transmit path connected with the first area and a second transmit path connected with the second area, in response to detecting that the digital pen is positioned at the charging position, and deactivate the first transmit path, in response to that the attempt of the activation of the sensor is detected.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

As described above, according to embodiments disclosed in the disclosure, the electronic device may reduce the interference of the conductive coil to charge the battery of the digital pen and may prevent the performance of the sensor from being deteriorated.

According to embodiments disclosed in the disclosure, the electronic device may embed the sensor inside the display and may prevent the recognition rate of the input of the digital pen from being degraded.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   an input detection panel configured to detect an input of a digital pen;
   a sensor disposed to be overlapped with the display and the input detection panel, when the display is viewed from a top; and
   at least one processor operatively connected with the display, the input detection panel, and the sensor,
   wherein the at least one processor is configured to:
      detect an attempt of activation of the sensor,
      activate the sensor and control at least a portion of a charging operation through the input detection panel, when the digital pen is positioned at a charging position,
      identify whether the input of the digital pen is detected, when the digital pen is not positioned at the charging position,
      deactivate the sensor, when the input of the digital pen is detected, or
      activate the sensor, when the input of the digital pen is not detected.

2. The electronic device of claim 1, wherein the at least one processor is further configured to:
   detect the attempt of the activation of the sensor, when
   a user input for an area, which corresponds to a position of the sensor, is received,
   a user input for requesting the activation of the sensor is received, or
   an application request for requesting the activation of the sensor is received, on the display.

3. The electronic device of claim 1, wherein the at least one processor is further configured to:
   output, to the display, a first graphical user interface (GUI) to guide an input of a user, in response to that the sensor is activated, and
   output, to the display, a second GUI indicating that the sensor is deactivated, in response to that the sensor is deactivated.

4. The electronic device of claim 1, wherein the at least one processor is further configured to:
   activate the charging operation, in response to detecting that the digital pen is positioned at the charging position, and
   deactivate the charging operation, in response to detecting the attempt of the activation of the sensor after the charging operation is activated.

5. The electronic device of claim 1,
   wherein the display further includes:
      a conductive coil configured to generate a charging signal for charging a battery of the digital pen,
   wherein the sensor is disposed to be overlapped with an opening formed in a partial area of a first input detection panel included in the input detection panel, and
   wherein a rear surface of the sensor is disposed to be overlapped with at least a portion of a second input detection panel included in the input detection panel.

6. The electronic device of claim 5,
   wherein the input detection panel includes:
      first conductive patterns configured to detect a first axis on an xy plane; and
      second conductive patterns configured to detect a second axis different from the first axis on the xy plane,
   wherein the at least one process is configured to:
      activate a first transmit path connected with the first axis and a second transmit path connected with the second axis, in response to detecting that the digital pen is positioned at the charging position, and
      deactivate one transmit path of the first transmit path or the second transmit path, in response to detecting the attempt of the activation of the sensor after detecting that the digital pen is positioned at the charging position.

7. The electronic device of claim 5,
   wherein the input detection panel includes:
      a first area at least partially overlapped with the sensor, when viewed from the top of the display; and
      a second area except the first area,
   wherein the at least one process is configured to:
      activate a first transmit path connected with the first area and a second transmit path connected with the second area, in response to detecting that the digital pen is positioned at the charging position, and
      deactivate the first transmit path, in response to detecting the attempt of the activation of the sensor after detecting that the digital pen is positioned at the charging position.

8. The electronic device of claim 5, further comprising:
   a third input detection panel disposed at a position at least partially overlapped with the second input detection panel, wherein a conductive coil of the third input detection panel is configured to be wound in a direction opposite to a direction in which a conductive coil of the second input detection panel is wound.

9. The electronic device of claim 8, further comprising:
a switch disposed at a position adjacent to the third sensing panel,
wherein the at least one process is configured to:
control the switch such that the third input detection panel is not activated, in response to detecting that the digital pen is positioned at the charging position, and
control the switch such that the third input detection panel is activated, in response to detecting the attempt of the activation of the sensor after detecting that the digital pen is positioned at the charging position.

10. The electronic device of claim 9, wherein the at least one processor is further configured to:
control the switch such that the third input detection panel is not activated, in response to detecting an input of another digital pen different from the digital pen.

11. A method of an electronic device, the method comprising:
detecting an attempt of activation of a sensor;
activating the sensor and controlling at least a portion of a charging operation, when a digital pen is positioned at a charging position;
identifying whether an input of the digital pen is detected, when the digital pen is not positioned at the charging position;
deactivating the sensor, when the input of the digital pen is detected; and
activating the sensor, when the input of the digital pen is not detected.

12. The method of claim 11, further comprising:
outputting a first graphical user interface (GUI) to guide an input of a user, in response to that the sensor is activated, and
outputting a second GUI indicating that the sensor is deactivated, in response to that the sensor is deactivated.

13. The method of claim 11, further comprising:
activating the charging operation, in response to detecting that the digital pen is positioned at the charging position,
wherein the controlling of at least the portion of the charging operation includes deactivating the charging operation, in response to detecting that the attempt of the activation of the sensor.

14. The method of claim 11, further comprising:
performing a dual Tx mode to output a signal through a plurality of transmit paths, in response to detecting that the digital pen is positioned at the charging position,
wherein the controlling of at least the portion of the charging operation includes:
performing a single Tx mode to activate only one transmit path of the plurality of transmit paths, in response to detecting the attempt of the activation of the sensor.

15. The method of claim 14, further comprising:
detecting an input of another digital pen different form the digital pen; and
performing the dual Tx mode, when the electronic device supports the digital pen and the other digital pen.

16. An electronic device comprising:
a display;
an input detection panel configured to detect an input of a digital pen;
a fingerprint sensor disposed to be overlapped with the display and the input detection panel, when the display is viewed from a top; and
at least one processor operatively connected with the display, the input detection panel, and the fingerprint sensor,
wherein the at least one processor is configured to:
detect an attempt of activation of the fingerprint sensor;
output, to the display, a first graphical user interface (GUI) to guide a fingerprint input of a user, in response to detecting that the fingerprint sensor is activated;
detect the input of the digital pen on the display; and
output, to the display, a second GUI indicating that the fingerprint sensor is deactivated, in response to that the input of the digital pen is detected.

17. The electronic device of claim 16, wherein the at least one processor is further configured to:
activate a charging operation, when detecting that the digital pen is positioned at the charging position,
deactivate the charging operation and activate the fingerprint sensor, when the attempt of the activation of the fingerprint sensor is detected, and
deactivate the fingerprint sensor, when the input of the digital pen or another digital pen different form the digital pen is detected.

18. The electronic device of claim 16, wherein the at least one processor is further configured to:
detect the attempt of the activation of the fingerprint sensor, when
a user input is received onto an area, which corresponds to a position of the fingerprint sensor,
a user input for requesting the activation of the fingerprint sensor is received, or
an application request for requesting the activation of the fingerprint sensor is received, on the display.

19. The electronic device of claim 17,
wherein the input detection panel includes:
first conductive patterns configured to detect a first axis on an xy plane; and
second conductive patterns configured to detect a second axis different from the first axis on the xy plane, and
wherein the at least one processor is further configured to:
activate a first transmit path connected with the first axis and a second transmit path connected with the second axis, in response to detecting that the digital pen is positioned at the charging position, and
deactivate one transmit path of the first transmit path or the second transmit path, in response to that the attempt of the activation of the fingerprint sensor is detected.

20. The electronic device of claim 17,
wherein the input detection panel includes:
a first area at least partially overlapped with the fingerprint sensor, when the display is viewed from a top; and
a second area except for the first area, and
wherein the at least one processor is further configured to:
activate a first transmit path connected with the first area and a second transmit path connected with the second area, in response to detecting that the digital pen is positioned at the charging position, and deactivate the first transmit path, in response to that the attempt of the activation of the sensor is detected.

\* \* \* \* \*